(12) United States Patent
Reid et al.

(10) Patent No.: US 8,209,632 B2
(45) Date of Patent: Jun. 26, 2012

(54) IMAGE MASK INTERFACE

(75) Inventors: Elizabeth Gloria Guarino Reid, San Francisco, CA (US); Kurt Allen Revis, Portland, OR (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 12/694,247

(22) Filed: Jan. 26, 2010

(65) Prior Publication Data
US 2011/0185297 A1 Jul. 28, 2011

(51) Int. Cl.
*G06F 3/048* (2006.01)
(52) U.S. Cl. ........ 715/833; 715/765; 382/282; 382/283; 345/620; 345/626
(58) Field of Classification Search ........ 715/833, 715/765, 732, 786, 787, 781, 788, 798, 799, 715/800, 801; 382/282, 283, 295, 296, 298; 345/619, 620, 622, 623, 626, 629, 634, 650
See application file for complete search history.

(56) References Cited

U.S. PATENT DOCUMENTS

| | | | | |
|---|---|---|---|---|
| 5,777,626 A * | 7/1998 | Takashima et al. | ........... | 345/443 |
| 6,128,013 A * | 10/2000 | Prabhu et al. | ................. | 715/707 |
| 6,587,596 B1 * | 7/2003 | Haeberli | ....................... | 382/283 |
| 6,850,247 B1 | 2/2005 | Reid et al. | | |
| 6,941,276 B2 * | 9/2005 | Haeberli | ..................... | 705/26.5 |
| 6,973,222 B2 * | 12/2005 | Haeberli | ..................... | 382/283 |
| 7,010,176 B2 * | 3/2006 | Kusunoki | .................... | 382/299 |
| 7,016,869 B1 * | 3/2006 | Haeberli | ..................... | 705/27.2 |
| 7,133,571 B2 * | 11/2006 | Cheatle | ....................... | 382/282 |
| 7,209,149 B2 * | 4/2007 | Jogo | .............................. | 345/622 |
| 7,289,132 B1 | 10/2007 | Reid et al. | | |
| 7,395,229 B2 * | 7/2008 | Haeberli | ..................... | 705/26.5 |
| 7,447,374 B1 | 11/2008 | Reid | | |
| 7,489,324 B2 * | 2/2009 | Royal et al. | ................... | 345/667 |
| 7,629,984 B2 | 12/2009 | Reid et al. | | |
| 7,643,704 B2 * | 1/2010 | Jackson et al. | ................ | 382/298 |
| 7,831,108 B2 * | 11/2010 | Wilensky et al. | ............. | 382/283 |
| 2001/0048447 A1 * | 12/2001 | Jogo | ............................. | 345/620 |
| 2002/0030634 A1 * | 3/2002 | Noda et al. | ....................... | 345/5 |
| 2002/0048413 A1 * | 4/2002 | Kusunoki | ..................... | 382/282 |
| 2002/0191861 A1 * | 12/2002 | Cheatle | ........................ | 382/282 |
| 2003/0065590 A1 * | 4/2003 | Haeberli | ........................ | 705/27 |
| 2003/0103234 A1 * | 6/2003 | Takabayashi et al. | ....... | 358/1.15 |
| 2003/0194148 A1 * | 10/2003 | Haeberli | ..................... | 382/283 |

(Continued)

OTHER PUBLICATIONS

U.S. Appl. No. 12/694,214, filed Jan. 26, 2010, Elizabeth Gloria Guarino Reid.

(Continued)

*Primary Examiner* — Weilun Lo
*Assistant Examiner* — Rashedul Hassan
(74) *Attorney, Agent, or Firm* — Fletcher Yoder PC

(57) ABSTRACT

Systems and methods are disclosed for an image editing process on an electronic device that uses an image mask to edit an image object. The image editing process may include an image mask overlying the image object and having a frame and an aperture. The image editing process may crop the image object based on the portions of the image object overlaid by the mask frame and the mask aperture. The image object and the image mask may be separately selected and manipulated by selecting different regions of the image object or the image mask. Additionally, a user may resize the image object by moving a slider, such as by touching and moving a slider knob along an axis.

8 Claims, 17 Drawing Sheets

U.S. PATENT DOCUMENTS

| | | | |
|---|---|---|---|
| 2005/0057576 A1* | 3/2005 | Shen et al. | 345/619 |
| 2005/0104897 A1* | 5/2005 | Walker et al. | 345/620 |
| 2005/0147322 A1* | 7/2005 | Saed | 382/284 |
| 2006/0023077 A1* | 2/2006 | Alton et al. | 348/222.1 |
| 2006/0115922 A1* | 6/2006 | Araya et al. | 438/61 |
| 2006/0155612 A1* | 7/2006 | Haeberli | 705/26 |
| 2006/0177132 A1* | 8/2006 | Jackson et al. | 382/173 |
| 2006/0188173 A1* | 8/2006 | Zhang et al. | 382/276 |
| 2006/0197963 A1* | 9/2006 | Royal et al. | 358/1.2 |
| 2008/0260282 A1* | 10/2008 | Hasegawa | 382/260 |
| 2009/0044138 A1 | 2/2009 | Rudolph et al. | |
| 2009/0070636 A1* | 3/2009 | Bultrowicz et al. | 714/48 |
| 2009/0076901 A1* | 3/2009 | Janos et al. | 705/14 |
| 2009/0080801 A1* | 3/2009 | Hatfield et al. | 382/283 |
| 2009/0147297 A1* | 6/2009 | Stevenson | 358/1.15 |
| 2010/0103330 A1* | 4/2010 | Morrison et al. | 348/744 |
| 2010/0156931 A1* | 6/2010 | Boreham et al. | 345/621 |
| 2010/0171712 A1* | 7/2010 | Cieplinski et al. | 345/173 |
| 2010/0328352 A1* | 12/2010 | Shamir et al. | 345/661 |
| 2011/0016419 A1* | 1/2011 | Grosz et al. | 715/769 |
| 2011/0157609 A1* | 6/2011 | Brady et al. | 358/1.6 |

OTHER PUBLICATIONS

U.S. Appl. No. 12/694,228, filed Jan. 26, 2010, Ted Stephen Boda.

* cited by examiner

IMAGE MASK INTERFACE

BACKGROUND

The present disclosure relates generally to electronic devices, and, more particularly to electronic devices having image manipulation and editing capabilities.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The graphical user interface ("GUI") of an electronic device may accomplish a variety of tasks and present a variety of information to a user. The user sees and interacts with the GUI, so it is beneficial if the GUI presents information and choices to a user in a way that is not only pleasing and natural to the eye but conducive to efficient use of the underlying application and hardware.

Some electronic devices include the capability to manipulate and edit images, such as to resize, crop, rotate, or otherwise edit an image. However, different electronic devices may offer a myriad of input devices, such as mouse and keyboard, touchscreens, etc. Existing image editing software may not provide an intuitive and efficient interface for working with and editing images, and such interfaces may not be usable with different input devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods are provided that include an electronic device having an image editing mode that includes an image object and an image mask overlaid on the image object. The image object may be manipulated by interaction with a first region on a display of the electronic device, and the image mask may be manipulated by interaction with a second region on the display of the electronic device. In certain embodiments, gestures may be used on a touchscreen display of the electronic device to resize, move, and/or rotate the image object and/or the image mask.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to an image editing process on an electronic device that uses an image mask to edit an image object. The image editing process may include an image mask overlaid on the image object and having a frame and an aperture. The image editing process may crop the image object based on the portions of the image object overlaid by the mask frame and the mask aperture. The border between the frame and the aperture may include one or more knobs that may be manipulated by a user to resize or reshape the mask, such as by touching and moving the knobs across a screen. Additionally, a user may resize the image object by moving a slider, such as by touching and moving a slider knob along an axis. The image editing process further includes the ability to rotate the image object, such as by touching a first region of the image object through the aperture and simultaneously touching a second region of the image object and rotating the second region around the portion of the image object. The image editing process may include the ability to move the image object by touching the image object and moving over the screen of the electronic device.

Figure 1:
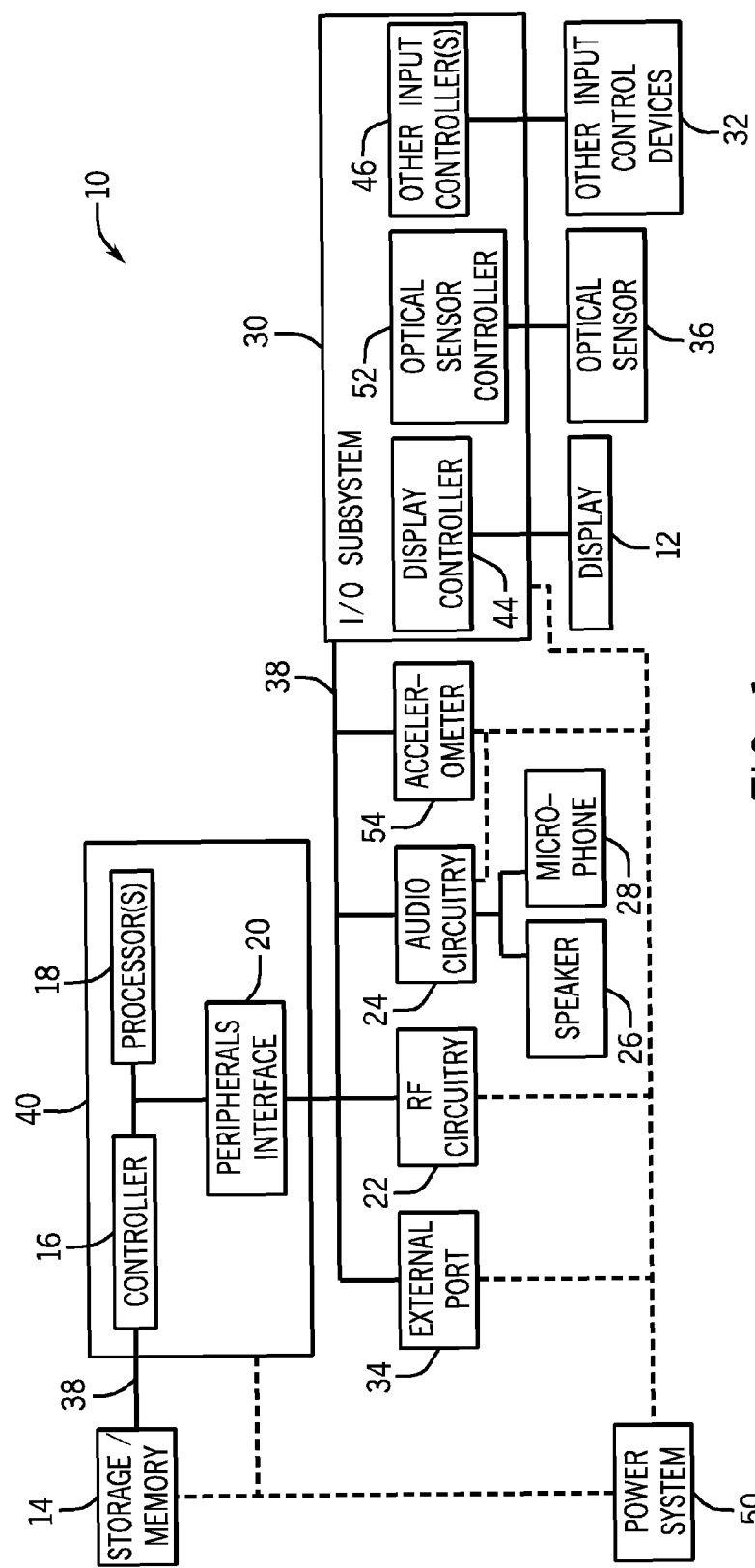
FIG. 1 is a block diagram of exemplary components of an electronic device that may be used in conjunction with aspects of the present disclosure.
Figure 2:
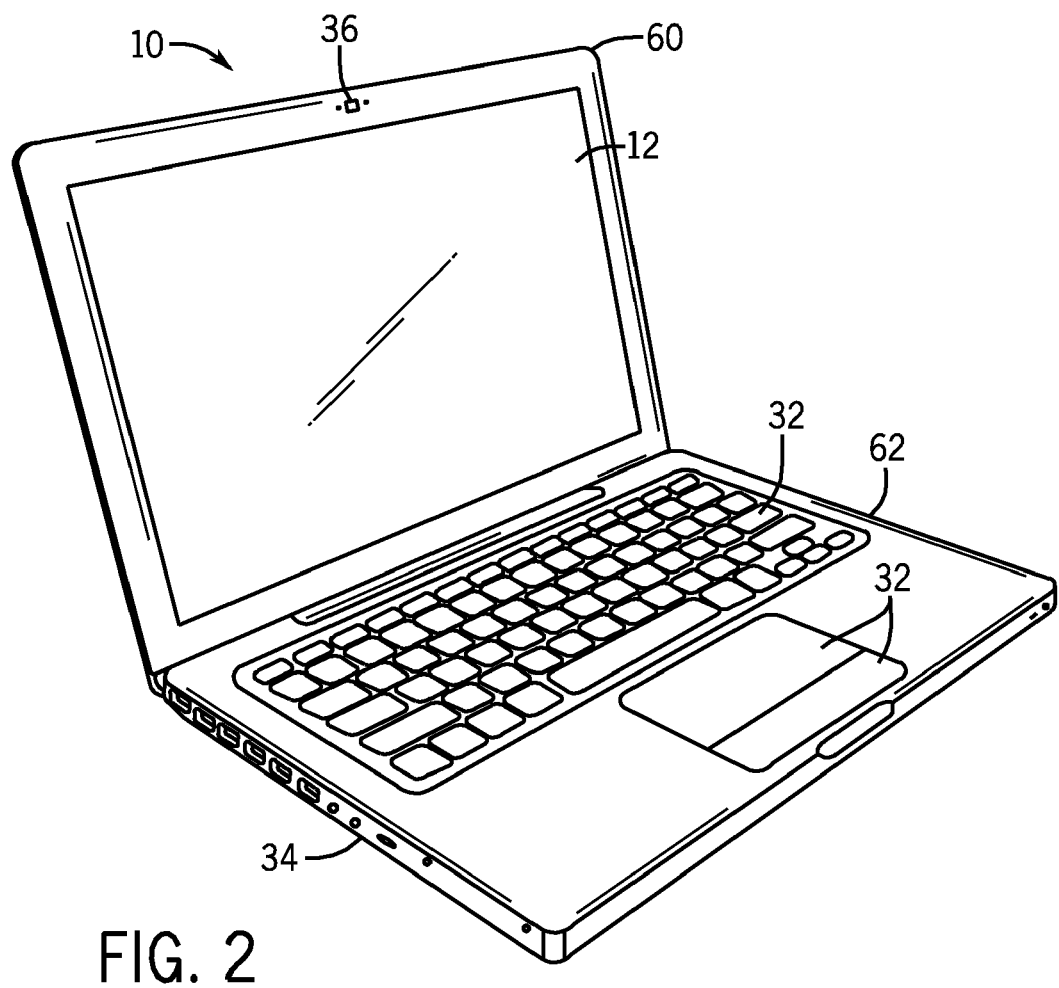
FIG. 2 is a perspective view of an electronic device in the form of a computer that may be used in conjunction with aspects of the present disclosure
Figure 3:
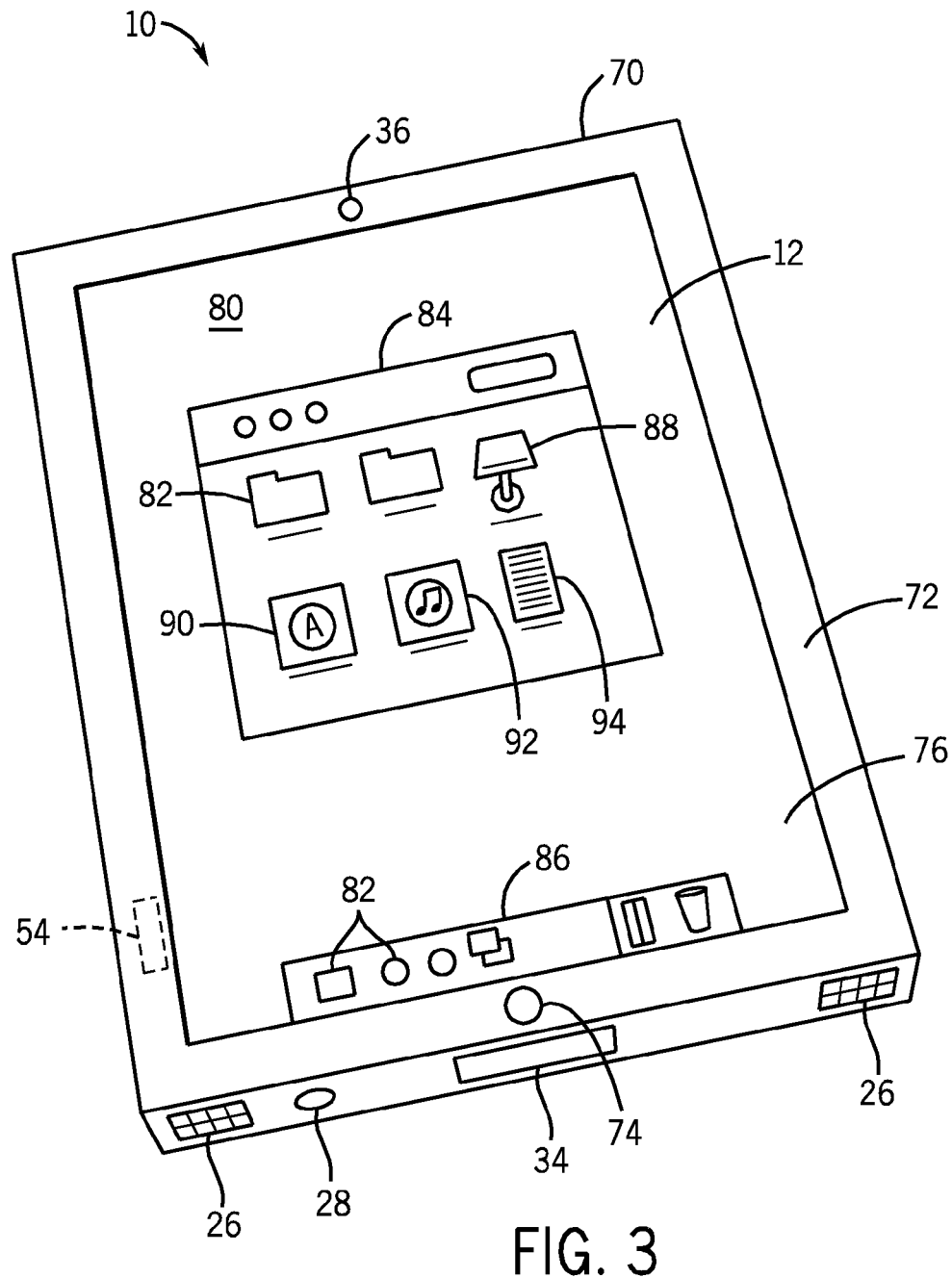
FIG. 3 is a perspective view of a tablet-style electronic device that may be used in conjunction with aspects of the present disclosure.

With these foregoing features in mind, a general description of suitable electronic devices for performing these functions is provided below. In FIG. 1, a block diagram depicting various components that may be present in electronic devices suitable for use with the present techniques is provided. In FIG. 2, one example of a suitable electronic device, here provided as a computer system, is depicted. In FIG. 3, another example of a suitable electronic device, here provided as a tablet-style device, is depicted. These types of electronic devices, and other electronic devices providing comparable display capabilities, may be used in conjunction with the present techniques.

An example of a suitable electronic device may include various internal and/or external components that contribute to the function of the device. FIG. 1 is a block diagram illustrating the components that may be present in such an electronic device 10 and which may allow the device 10 to function in accordance with the techniques discussed herein. As will be appreciated, various components of electronic device 10 may be provided as internal or integral components of the electronic device 10 or may be provided as external or connectable components. It should further be noted that FIG. 1 is merely one example of a particular implementation and is intended to illustrate the types of components and/or functionalities that may be present in electronic device 10.

In various embodiments, the electronic device 10 may be a media player, a cellular telephone, a laptop computer, a desktop computer, a tablet computer, a personal data organizer, an e-book reader (e-reader), a workstation, or the like. For example, in certain embodiments, the electronic device 10 may be a portable electronic device, such as a tablet device or a model of an iPod® or iPhone® available from Apple Inc. of Cupertino, Calif. In other embodiments, electronic device 10 may be a desktop, tablet, or laptop computer, including a MacBook®, MacBook® Pro, MacBook Air®, iMac®, Mac® Mini, or Mac Pro®, also available from Apple Inc. In further embodiments, electronic device 10 may include other models and/or types of electronic devices suitable for implementing the features disclosed herein.

As discussed herein, the electronic device 10 may be used to store and/or execute a variety of applications. Such applications may include, but are not limited to: drawing applications, presentation applications, a word processing applications, website creation applications, disk authoring applications, spreadsheet applications, gaming applications, telephone applications, video conferencing applications, e-mail applications, instant messaging applications workout support applications, photo management applications, digital camera applications digital video camera applications, web browsing applications, e-book reader applications, digital music player applications, and/or digital video player applications. Further, the electronic device 10 may be used to store, access, and/or modify data, routines, and/or drivers used in conjunction with such applications.

Various applications that may be executed on the electronic device 10 may utilize or share the same user interface devices, such as a touch-sensitive surface (e.g., a touch screen or touch pad), a mouse, a keyboard, and so forth. One or more functions of such interface devices, as well as corresponding information displayed on the electronic device 10, may be adjusted and/or varied from one application to the next and/or within a respective application. In this way, a common physical architecture (such as the interface devices provided by the electronic device 10) may support a variety of applications with user interfaces that are intuitive and transparent.

The depicted electronic device includes a display 12. In one embodiment, the display 12 may be based on liquid crystal display (LCD) technology, organic light emitting diode (OLED) technology, or light emitting polymer display (LPD) technology, although other display technologies may be used in other embodiments. In accordance with certain embodiments, the display 12 may include or be provided in conjunction with touch sensitive elements. Such a touch-sensitive display may be referred to as a "touch screen" and may also be known as or called a touch-sensitive display system.

In addition, the electronic device 10 may include one or more storage/memory components 14 (which may include one or more computer readable storage mediums), a memory controller 16, one or more processing units (CPUs, GPUs, and so forth) 18, a peripherals interface 20, RF circuitry 22, audio circuitry 24, a speaker 26, a microphone 28, an input/output (I/O) subsystem 30, input and/or control devices 32, and an external port 34. Further, in certain embodiments, the electronic device 10 may include one or more optical sensors 36. These components may communicate over one or more communication buses or signal lines 38.

It should be appreciated that the depicted electronic device 10 is only one example of a suitable device, and that the electronic device 10 may have more or fewer components than shown, may combine the functionality of two or more of the depicted components into a single component, or a may have a different configuration or arrangement of the components. Further, the various components shown in FIG. 1 may be implemented in hardware (including circuitry), software (including computer code stored on a computer-readable medium), or a combination of both hardware and software, including one or more signal processing and/or application specific integrated circuits.

With respect to the specific depicted components, the storage/memory component(s) 14 may include high-speed random access memory and/or may also include non-volatile memory, such as one or more magnetic disk storage devices, flash memory devices, or other non-volatile solid-state memory devices. Access to storage/memory components 14 by other components of the device 10, such as the processor 18 and the peripherals interface 20, may be controlled by one or more respective controllers 16, such as a memory controller, disk controller, and so forth.

The peripherals interface 20 couples various input and output peripherals of the electronic device 10 to the processor 18 and storage/memory components 14. The one or more processors 18 run or execute various software programs and/or sets of instructions stored in storage/memory components 14 (such as routines or instructions to implement the features discussed herein) to perform various functions on the electronic device 10 and/or to process data. In some embodiments, the peripherals interface 20, the processor 18, and the memory controller 16 may be implemented on a single chip, such as a chip 40. In other embodiments, these components and/or their functionalities may be implemented on separate chips.

The RF (radio frequency) circuitry 22 receives and sends RF signals, also called electromagnetic signals. The RF circuitry 22 converts electrical signals to/from electromagnetic signals and communicates with communications networks and other communications devices via the electromagnetic signals. The RF circuitry 22 may include known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 22 may communicate with networks, such as the Internet, also referred to as the World Wide Web (WWW), an intranet and/or a wireless network, such as a cellular telephone network, a wireless local area network (LAN) and/or a metropolitan area network (MAN), and/or other devices by wireless communication. The wireless communication may use any suitable communications standard, protocol and/or technology, including but not limited to Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., based upon the IMT Advanced standard), Long-Term Evolution Advanced (LTE Advanced), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), and/or Short Message Service (SMS), or any other suitable existing or later developed communication protocol.

The audio circuitry 24, the speaker 26, and the microphone 28 provide an audio interface between a user and the electronic device 10. In one embodiment, the audio circuitry 24 receives audio data from the peripherals interface 20, converts the audio data to an electrical signal, and transmits the electrical signal to the speaker 26. The speaker 26 converts the electrical signal to audible sound waves. The audio circuitry 24 also receives electrical signals converted by the microphone 28 from sound waves. The audio circuitry 24 converts the electrical signal to audio data and transmits the audio data to the peripherals interface 20 for processing. Audio data may be retrieved from and/or transmitted to the storage/memory components 14 and/or the RF circuitry 22 by the peripherals interface 20. In some embodiments, the audio circuitry 24 may include an output jack (e.g., an audio out jack or a headset jack). The output jack provides an interface between the audio circuitry 24 and removable audio input/output peripherals, such as output-only speakers, headphones or a headset with both output (e.g., a headphone for one or both ears) and input (e.g., a microphone).

The I/O subsystem 30 couples input/output peripherals on the electronic device 10, such as a display 12, and other input/control devices 32, to the peripherals interface 20. The I/O subsystem 30 may include a display controller 44 and one or more input controllers 46 for other input or control devices. The one or more input controllers 46 receive/send electrical signals from/to other input or control devices 32. The other input/control devices 32 may include physical buttons (e.g., push buttons, rocker buttons, etc.), dials, slider switches, joysticks, click wheels, a touch pad, and so forth. In some alternate embodiments, the input controller(s) 46 may be coupled to any (or none) of the following: a keyboard, infrared port, USB port, and/or a pointer device such as a mouse. Examples of input/control devices 32 in the form of buttons may include an up/down button for volume control of the speaker 26 and/or the microphone 28, on/off buttons, and/or buttons used to invoke a home screen on the display 12 of the electronic device 10.

When present, a display 12 implemented as a touch screen provides an input interface and an output interface between the electronic device 10 and a user. In one such embodiment, the display controller 44 receives and/or sends electrical signals from/to the display 12 and the corresponding touch sensitive elements. The display 12 displays visual output to the user. The visual output may include graphics, alphanumeric characters, icons, video, and so forth (collectively termed "graphics"). In some embodiments, some or all of the visual output may correspond to user-interface objects.

In embodiments employing a touch screen, the display 12 has a touch-sensitive surface, sensor or set of sensors that accepts input from the user based on haptic and/or tactile contact. The touch screen and the display controller 44 generate signals in response to contact (and any movement or breaking of the contact) on the display 12, and the signals may be received and processed in accordance with routines executing on the processor 18 such that the signals (and the contact they represent) are recognized as interactions with user-interface objects that are displayed on the display 12. In an exemplary embodiment, a point of contact between a touch screen 12 and the user corresponds to an appendage, e.g., a finger, of the user, and/or a stylus wielded by the user.

In embodiments where a touch screen is employed, the display 12 and the display controller 44 may detect contact and/or movement (or breaks in such movement) using a suitable touch sensing technologies, including but not limited to capacitive, resistive, infrared, and surface acoustic wave technologies, as well as other proximity sensor arrays or other elements for determining one or more points of contact with the display 12. The user may make contact with such a touch sensitive display 12 using any suitable object or appendage, such as a stylus, a finger, and so forth. In some embodiments, a touch-sensitive display may be multi-touch sensitive, i.e., sensitive to multiple concurrent contacts. In an exemplary embodiment, projected mutual capacitance sensing technology is used, such as that found in the iPhone® and iPod Touch® from Apple, Inc. of Cupertino, Calif.

The electronic device 10 also includes a power system 50 for powering the various components. The power system 50 may include a power management system, one or more power sources (e.g., battery, alternating current (AC)), a recharging system, a power failure detection circuit, a power converter or inverter, a power status indicator (e.g., a light emitting diode (LED)) and any other components associated with the generation, management and distribution of power in electronic devices.

The electronic device 10 may also include one or more optical sensors 36. FIG. 1 shows an optical sensor 36 coupled to an optical sensor controller 52 in the I/O subsystem 30. The optical sensor 36 may include a charge-coupled device (CCD) or complementary metal-oxide semiconductor (CMOS) phototransistors. The optical sensor 36 receives light from the environment, projected through one or more lens, and converts the light to data representing an image. In conjunction with appropriate code executing on the processor 18, the optical sensor 36 may capture still images and/or video.

The electronic device 10 may also include one or more accelerometers 54. FIG. 1 shows an accelerometer 54 coupled to the peripherals interface 20. Alternately, the accelerometer 54 may be coupled to an input controller 46 in the I/O subsystem 30. In some embodiments, information is displayed on the display 12 in a portrait view or a landscape view based on an analysis of data received from the one or more accelerometers (e.g., based upon a position in which the electronic device 10 is presently oriented).

In some embodiments, the software components stored in storage/memory 14 may include an operating system, a communication module (or set of instructions), a contact/motion module (or set of instructions), a graphics module (or set of instructions), as well as any other suitable modules or instructions used in the operation of the device 10 or by interfaces or applications executing on the device 10. By way of example, an operating system may be based upon various software platforms, such as Darwin, RTXC, LINUX®, UNIX®, OS X, WINDOWS®, or an embedded operating system such as VxWorks, and may include various software components and/or drivers for controlling and managing general system tasks (e.g., memory management, storage device control, power management, etc.) and facilitates communication between various hardware and software components.

In addition, the software components stored in storage/memory 14 may include various applications and media (e.g., music, videos, e-books) loaded or purchased by a user of the device 10 to provide additional functionality to the device 10. By way of example only, the storage/memory 14 may be configured to store applications and media purchased and/or downloaded from the App Store® or from iTunes®, both of which are online services offered and maintained by Apple Inc.

The communication module facilitates communication with other devices over one or more external ports 34 and also includes various software components for handling data received by the RF circuitry 22 and/or the external port 34. The external port 34 (e.g., Universal Serial Bus (USB), FIREWIRE, Ethernet port, etc.) is adapted for coupling directly to other devices or indirectly over a network (e.g., the Internet, wireless LAN, etc.). In some embodiments, the external port 34 is a multi-pin (e.g., 30-pin) connector that is the same as, or similar to and/or compatible with the 30-pin connector used on iPod® devices.

The contact/motion module may facilitate the detection and/or interpretation of contact with a touch sensitive input device, such as a touch screen, click wheel or touch pad. The contact/motion module includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The graphics module includes various known software components for rendering and displaying graphics on the display 12 or other connected displays or projectors, including components for changing the intensity of graphics that are displayed. As used herein, the term "graphics" includes any object that can be displayed to a user. In some embodiments, the graphics module stores data representing graphics to be used. Each graphic may be assigned a corresponding code. The graphics module receives, from applications etc., one or more codes specifying graphics to be displayed along with, if necessary, coordinate data and other graphic property data, and then generates screen image data to output to the display controller 44.

Examples of applications that may be stored in storage/memory 14 may include work productivity applications as well as other applications. Examples of such applications may include word processing applications, image editing applications, drawing applications, presentation applications, JAVA-enabled applications, encryption, digital rights management, voice recognition, and voice replication.

With the foregoing discussion of the functional and structural components of an electronic device 10 in mind, FIGS. 2 and 3 depict examples of how such a device 10 may be implemented in practice. For example, FIG. 2 depicts an electronic device 10 in the form of a laptop computer 60. As shown in FIG. 2, the electronic device 10 in the form of a laptop computer 60 includes a housing 62 that supports and protects interior components, such as processors, circuitry, and controllers, among others. The housing 62 also allows access to user input devices 32, such as a keypad, touchpad, and buttons, which may be used to interact with the laptop computer 60. For example, the user input devices 32 may be manipulated by a user to operate a GUI and/or applications running on the laptop computer 60.

The electronic device 10 in the form of the laptop computer 60 also may include various external ports 34 that allow connection of the laptop computer 60 to various external devices, such as a power source, printer, network, or other electronic device. For example, the laptop computer 60 may be connected to an external projector through a cable connected to a respective external port 34 of the laptop computer 60.

In addition to computers, such as the depicted laptop computer 60 of FIG. 2, an electronic device 10 may take other forms, such as a portable multi-function device 70 (e.g., a cellular telephone or a tablet computing device) as depicted in FIG. 3. It should be noted that while the depicted multi-function device 70 is provided in the context of a tablet computing device, other types of portable or handheld devices (such as cellular telephones, media players for playing music and/or video, a camera or video recorder, personal data organizers, handheld game platforms, and/or combinations of such devices) may also be suitably provided as the electronic device 10. Further, a suitable multi-function device 70 may incorporate the functionality of more than one of these types of devices, such as a device that incorporates the functionality of two or more of a media player, a cellular phone, a gaming platform, a personal data organizer, and so forth. For example, in the depicted embodiment, the multi-function device 70 is in the form of a tablet computer that may provide various additional functionalities (such as the ability to take pictures, record audio and/or video, listen to music, play games, and so forth).

In the depicted embodiment, the handheld device 70 includes an enclosure or body 72 that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 70 to facilitate wireless communication.

In the depicted embodiment, the enclosure 72 includes user input structures 32 (such as the depicted button 74 and touch sensitive elements 76 incorporated into display 12 to form a touch screen) through which a user may interface with the device 70. Each user input structure 32 may be configured to help control a device function when actuated. For example, the button 74 may be configured to invoke a "home" screen or menu to be displayed. Other buttons, switches, rockers, and so forth may be provided to toggle between a sleep and a wake mode, to silence a ringer or alarm, to increase or decrease a volume output, and so forth.

In the depicted embodiment, the multi-function device 70 includes a display 12 that may be used to display a graphical user interface (GUI) 80 that allows a user to interact with the multi-function device 70. The GUI 80 may include various layers, windows, screens, templates, or other graphical elements that may be displayed in all, or a portion, of the display 12. The graphical elements may include icons 82 and other images representing buttons, sliders, menu bars, and the like. The icons 82 may be selected and/or activated via touching their locations on the display 12 in embodiments in which the display 12 is provided as a touch screen.

Generally, the GUI 80 may include graphical elements that represent applications and functions of the multi-function device 70. For instance, in the depicted embodiment, an operating system GUI 80 may include various graphical icons 82, each of which may correspond to various applications that may be opened or executed upon detecting a user selection (e.g., via keyboard, mouse, touchscreen input, voice input, etc.). The icons 82 may be displayed in a graphical dock 86 or within one or more graphical window elements 84 displayed on the screen of the display 12. By way of example only, the depicted icons 82 may represent a presentation application 88, such as Keynote® from Apple Inc., an application 90 for accessing the App Store® service from Apple Inc., an application 92 for accessing the iTunes® service from Apple Inc., as well as an e-reader/e-book application 94.

In some embodiments, the selection of a particular icon 82 may lead to a hierarchical navigation process, such that selection of an icon 82 leads to a screen or opens another graphical window that includes one or more additional icons 82 or other GUI elements. By way of example only, the operating system GUI 52 displayed in FIG. 4 may be from a version of the Mac OS® operating system, available from Apple Inc.

The multi-function device 70 also may include various external ports 34 that allow connection of the multi-function device 70 to external devices, such as computers, projectors, modems, telephones, external storage devices, and so forth. For example, one external port may be a port that allows the transmission and reception of data or commands between the multi-function device 70 and another electronic device, such as a computer. One or more of external ports 34 may be a proprietary port from Apple Inc. or may be an open standard I/O port.

With the foregoing discussion in mind, various techniques and algorithms for implementing aspects of the present disclosure on electronic devices 10 and associated hardware and/or memory devices are discussed below. For example, in certain implementations, an electronic device 10 may be employed to store and/or run a work productivity application or suite of applications. One example of such applications includes the Pages® word processing application, the Numbers® spreadsheet application, and the Keynote® presentation application, which are all provided within the iWork® application suite available from Apple Inc. of Cupertino, Calif. In certain embodiments, such applications, or aspects of such applications, may be encoded using a suitable object-oriented programming language, such as Objective-C, C++, C#, and so forth.

By way of example, a presentation application, such as Keynote® may be employed to generate and present slideshows, typically consisting of a sequential display of prepared slides. For example, turning to FIG. 4, an illustrative screen 120 of a presentation application is depicted in accordance with one embodiment of the disclosure. Such a presentation application may be stored as one or more executable routines in storage/memory 14 (FIG. 1) and, when executed, may cause the display of screens, such as screen 120, on a display 12, such as a display configured for use as a touch screen.

Prior to discussing the use or features of a presentation application in accordance with the present disclosure, it should be appreciated that, as used herein, a "slide" should be understood to refer to a discrete unit on which one or more objects may be placed and arranged. Such slides should also be understood to be discrete units or elements of an ordered or sequential presentation, i.e., the slides are the pieces or units that are assembled and ordered to generate the presentation. Such a slide, may be understood to function as a container or receptacle for a set of objects (as discussed below) that together convey information about a particular concept or topic of the presentation. A slide may contain or include different types of objects (e.g., text, numbers, images, videos, charts, graphs, and/or audio, and so forth) that explain or describe a concept or topic to which the slide is directed and which may be handled or manipulated as a unit due to their being associated with or contained on the slide unit.

The order or sequence of the slides in a presentation or slideshow is typically relevant in that the information on the slides (which may include both alphanumeric (text and numbers) and graphical components) is meant to be presented or discussed in order or sequence and may build upon itself, such that the information on later slides is understandable in the context of information provided on preceding slides and would not be understood or meaningful in the absence of such context. That is, there is a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

As used herein, the term "object" refers to any individually editable component on a slide of a presentation. That is, something that can be added to a slide and/or be altered or edited on the slide, such as to change its location, orientation, size, opacity, color, or to change its content, may be described as an object. For example, a graphic, such as an image, photo, line drawing, clip-art, chart, table, which may be provided on a slide, may constitute an object. Likewise, a character or string of characters may constitute an object. Likewise, an embedded video or audio clip may also constitute an object that is a component of a slide. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or "texture".

Further, because a slide may contain multiple objects, the objects on a slide may have an associated z-ordering (i.e., depth) characterizing how the objects are displayed on the slide. That is, to the extent that objects on the slide may overlap or interact with one another, they may be ordered, layered or stacked in the z-dimension with respect to a viewer (i.e., to convey depth) such that each object is ordered as being above or beneath the other objects as they appear on the slide. As a result, in the event of an overlap of objects, a higher object can be depicted as overlying or obscuring a lower object. In this way, a slide may not only have a width and length associated with it, but also a depth (i.e., a z-axis).

Thus, as used herein, the term "slide" should be understood to represent a discrete unit of a slideshow presentation on which objects may be placed or manipulated. Likewise, an "object" as used herein should be understood to be any individually editable component that may be placed on such a slide. Further, as used herein, the term "transition" describes the act of moving from one slide to the next slide in a presentation. Such transitions may be accompanied by animations or effects applied to one or both of the incoming and outgoing slide. Likewise, the term "build" as used herein should be understood as describing effects or animations applied to one or more objects provided on a slide or, in some instances to an object or objects that are present on both an outgoing and incoming slide. For example, an animation build applied to an object on a slide may cause the object to be moved and rotated on the slide when the slide is displayed. Likewise, an opacity build applied to an object on a slide may cause the object to fade in and/or fade out on the slide when the slide is displayed.

Figure 4:
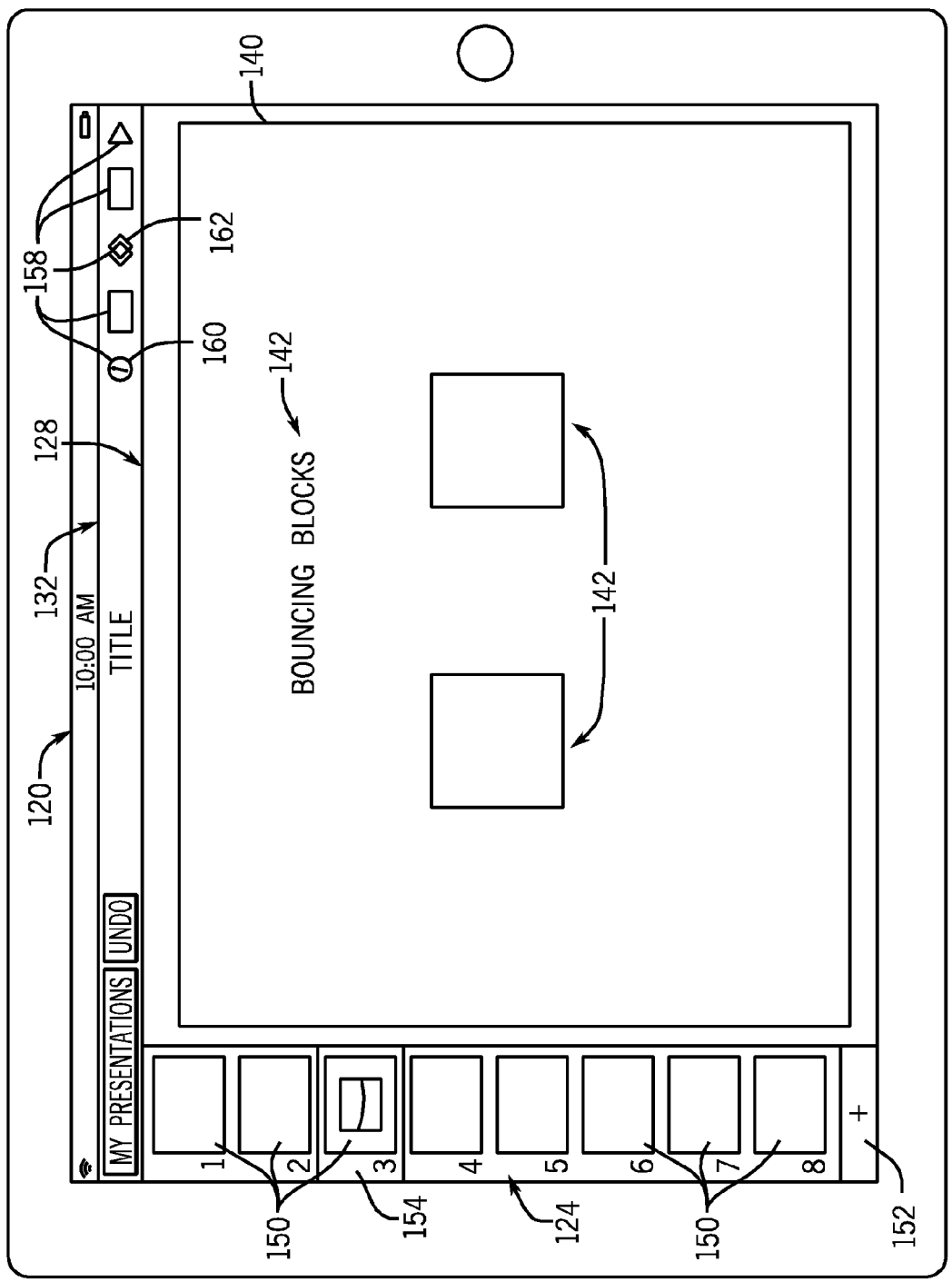
FIG. 4 depicts a screen of a presentation application used for generating slides in accordance with aspects of the present disclosure.

With the foregoing in mind, and turning to FIG. 4, it will be appreciated that, in certain embodiments a presentation application may provide multiple modes of operation, such as an edit mode, an animation mode, a presentation or play mode, and so forth. When in the edit mode, the presentation application may provide an interface for a user to add, edit, remove, or otherwise modify the slides of a slide show, such as by adding text, numeric, graphic, or video objects to a slide. Likewise, when in the animation mode, the presentation application may provide an interface for a user to apply and/or modify animation or effects applied to slide transitions between slides or to builds (e.g., animations, effects, and so forth) applied to objects on a slide. To display a created slide or a sequence of slides in a format suitable for audience viewing, a presentation mode of the presentation application may be employed which displays the slides, slide transitions, and object builds in a specified sequence. In some embodiments, the presentation application may provide a full-screen presentation of the slides in the presentation mode, including any animations, transitions, builds or other properties defined for each slide and/or object within the slides.

The screen 120 of FIG. 4 represents a screen that may be displayed when one embodiment of a presentation application is in an edit mode, such as for slide creation or modification. In the depicted example, the screen 120 includes three panes: a slide organizer or navigator pane 124, a slide canvas 128, and a toolbar 132 for creating and editing various aspects of a slide 140 of a presentation. By using these panes, a user may select a slide 140 of a presentation, add objects 142 to and/or edit objects 142 on the slide 140 (such as the depicted graphic objects and character objects), and animate or add effects related to the slide or the objects 142 on the slide 140.

The navigator pane 124 may display a representation 150 of each slide 140 of a presentation that is being generated or edited. The slide representations 150 may take on a variety of forms, such as an outline of the text in the slide 140 or a thumbnail image of the slide 140. Navigator pane 124 may allow the user to organize the slides 140 prepared using the application. For example, the user may determine or manipulate the order in which the slides 140 are presented by dragging a slide representation 150 from one relative position to another. In certain embodiments, the slides representations 150 in the navigator pane 124 may be indented or otherwise visually set apart for further organizational clarity. In addition, in certain embodiments, the navigator pane 124 may include an option 152 which, when selected, adds a new slide to the presentation. After being added, the slide representation 150 for such a new slide may be selected in the navigator pane 124 to display the slide 140 on the canvas 128 where objects 142 may be added to the new slide 140 and/or the properties of the new slide 140 may be manipulated.

In certain implementations, selection of a slide representation 150 in the navigator pane 124 results in the presentation application displaying the corresponding slide information on the slide canvas 128. For example, for a selected slide representation (here depicted as slide 3, identified by highlight region 154) the corresponding slide 140 may be displayed on the slide canvas 128. The displayed slide 140 may include one or more suitable objects 142 such as, for example, text, images, graphics, video, or any other suitable object. In some embodiments, a user may add or edit features or properties of a slide 140 when displayed on the slide canvas 128, such as slide transitions, slide background, and so forth. In addition, in some embodiments a user may add objects 142 to or remove objects 142 from the slide 140 or may manipulate an object 142 on the slide 140, such as to change the location or appearance of the object 142 or to add or edit animations or builds to the object 142. The user may select a different slide 140 to be displayed for editing on slide canvas 124 by selecting a different slide representation 150 from the navigator pane 124, such as by touching the displayed slide representation 150 in a touch screen embodiment of the device 10.

In the depicted implementation a user may customize objects 142 associated with the slide 140 or the properties of the slide 140 using various tools provided by the presentation application. For example, in certain embodiments, when in the edit mode, selection of a slide 140, object 142, and/or toolbar option 158 may cause the display of an interface presenting one or more selectable options for the selected slide 140 or object 142, which a user may then select, deselect, or otherwise manipulate to modify the slide 140 or object 142 as desired. For example, selection of certain toolbar options 158, such as an inspector or information icon 160, may cause properties of the selected object 142 or slide 140 to be displayed for review and/or modification. Likewise, selection of an animation mode icon 162 from among the toolbar options 158 may cause the presentation application to enter an animation mode from which builds or animations applied to objects and/or transitions assigned to slides may be reviewed, edited, and/or manipulated. Similarly, selection of a play mode icon 164 from among the toolbar options 158 may cause the presentation application to enter a presentation mode in which the slides 140 of the slide presentation are sequentially displayed on the display 12 or an attached display device.

Additionally, the electronic device 10 may include image editing capabilities, such as the ability to resize, rotate, move, crop, or otherwise edit an image object of a slide. In some embodiments, for example, the electronic device 10 may include an image editing mode having an image mask to provide image cropping and other editing functions. FIGS. 5-16 below depict the image mask and image editing functions of an exemplary embodiment of the electronic device 10. As described in detail below, in some editing functions, the image mask may be manipulated separately from the image object. In other editing functions, the image mask and image object may manipulated together while the size of the image mask relative to the image object is maintained. The image masking feature may be operable on different embodiments of the electronic device 10, e.g., the laptop 40 or the multi-function electronic device 70. For example, in some embodiments the image editing functions described below may be activated by a touchscreen, e.g., display 12, to provide faster and easier selection and editing of an image, or multiple images. For example, a user may interact with touch sensitive elements 76 of the multi-function device 70 to perform some or all of the image editing capabilities described below. It should be appreciated that such interactions with the touchscreen, e.g., display 12, may be referred to as "gestures." Thus, as used below, the terms "select," "hold," and "move" with reference to the various image editing functions may include any suitable action involving an embodiment of the electronic device 10, such that "select" may include touching a touchscreen with an appendage or stylus, or clicking a cursor location on a display with a mouse button or pressing a key or keys on a keyboard. Similarly, "hold" may include maintaining contact between a touchscreen and an appendage or stylus, or maintaining depression of a mouse button or a key on a keyboard. In like manner, "move" may include moving an appendage or stylus over a touchscreen, or moving a cursor on a display by moving a mouse or depressing keys on a keyboard.

Figure 5:
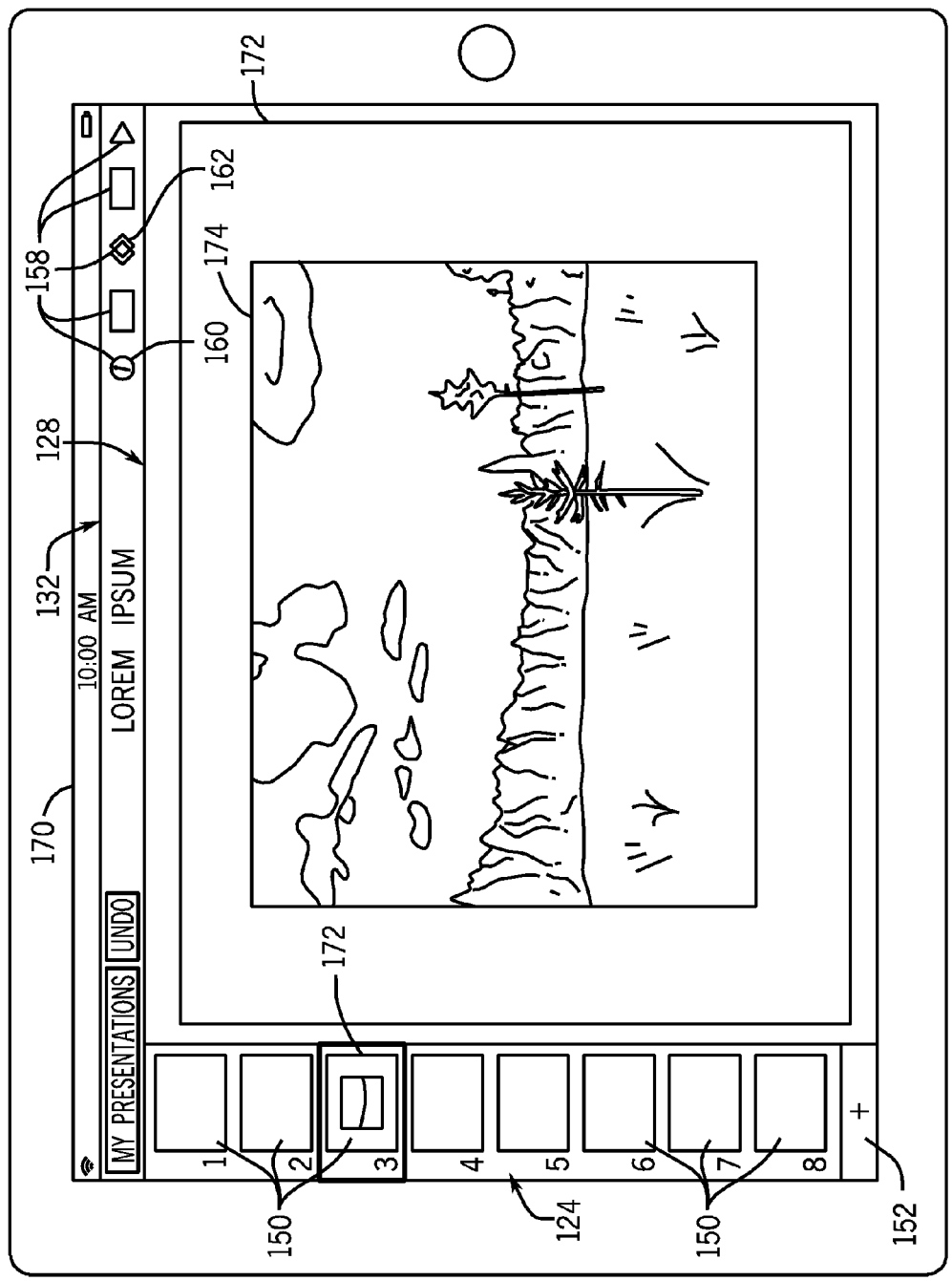
FIG. 5 depicts a screen of an image object in a slide of the presentation application in accordance with aspects of the present disclosure.

Turning now to FIG. 5, FIG. 5 depicts a screen 170 of the electronic device 10 that may be displayed after a user has selected one of a slide 172 for editing. As noted above, the screen 170 also depicts the slide organizer or navigator pane 124, the slide canvas 128, and the toolbar 132. The selected slide 172 may include an image object 174 that is displayed on the slide canvas 128. Although FIGS. 5-16 are described with reference to a single image object 174, it should be appreciated that the techniques described below and illustrated in FIGS. 5-16 may be applied to multiple image objects of a selected slide displayed on the slide canvas 128.

To enter an image editing mode, a user may perform an appropriate interaction with the electronic device 10. For example, the user may select an icon displayed on the screen 170 of the electronic device 10, such as by selecting (e.g., touching) the inspector or information icon 160. Alternatively, a user may "double tap" or "double click" any portion of the image object 172 to enter the image editing mode.

Figure 6:
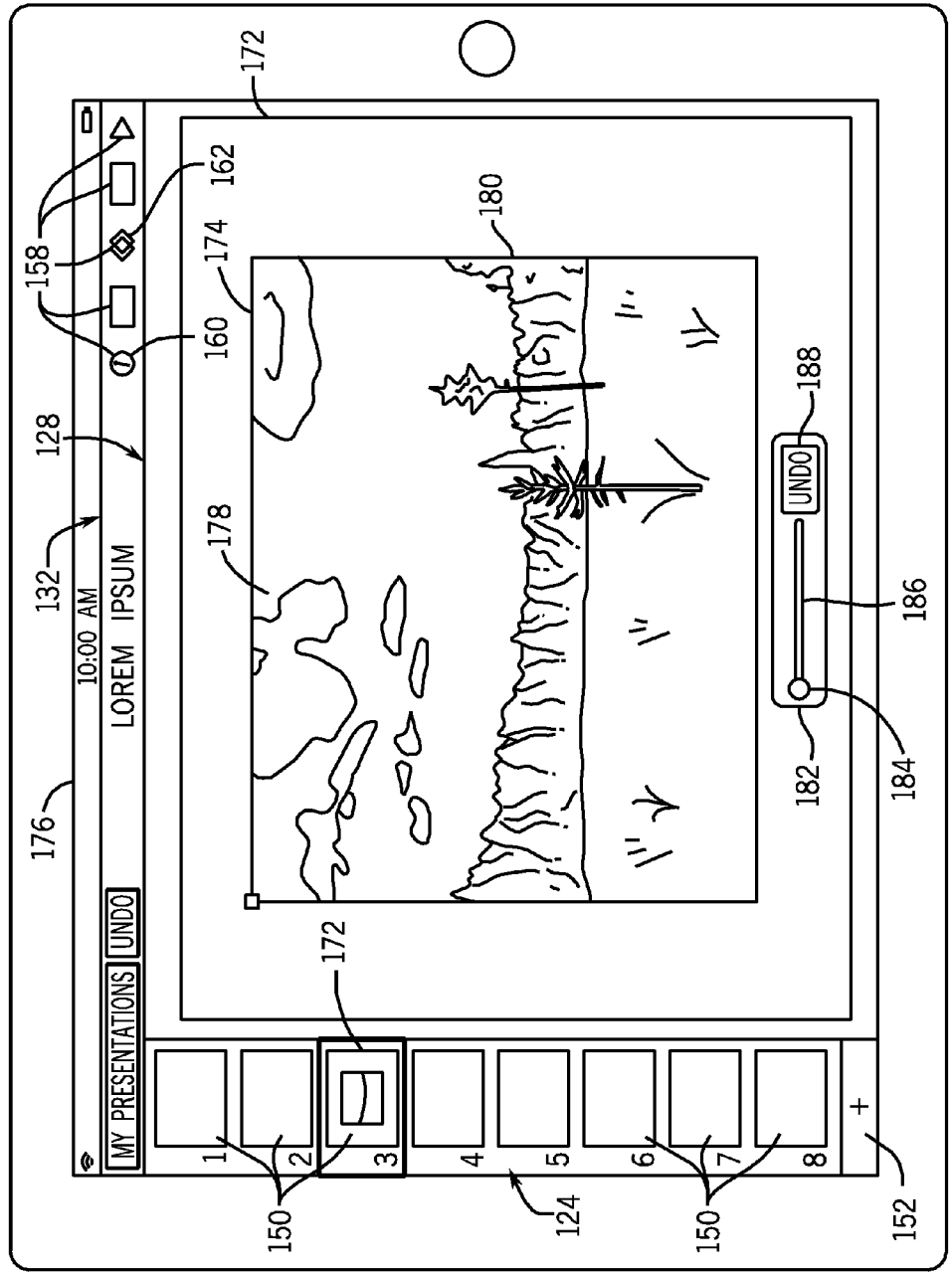
FIGS. 6 and 7 depict screens of an image editing mode with an image mask on the image object in accordance with aspects of the present disclosure.

Upon initiation of an image editing mode, an image mask is created and displayed on the slide canvas 128. FIG. 6 depicts a screen 176 of the electronic device 10 showing an image mask 178 overlying the image object 174. In one embodiment, the initial size (e.g., height and width dimensions) of the aperture of the image mask 178 is the same size (e.g., height and width dimensions) as the image object 174, such that the frame of the image mask 178 aligns with the border 180 of the image object 174. Additionally, after creation of the image mask 178, a slider 182 may be displayed on the slide canvas 128. The slider 182 may be used to manipulate the size of the image object 174, and may be manipulated by moving a slide button 184 along a slide axis 186. As discussed further below, in one embodiment the slider 182 may correspond to the ratio of a dimension of the image object 174 to a dimension of the aperture of the image mask 178. In one embodiment, the slider 182 (and the position of the slider button 184 on the slide axis 186) may correspond to the greater of the ratio of the image object height to the mask aperture height or the ratio of the image object width to the mask aperture width. For example, such a ratio may have a value of 1 when the slide button 184 is located in the position shown in FIG. 6. A "DONE" icon 188 may be displayed proximate to the slider 182 to receive an indication that the image masking process is complete.

Figure 7:
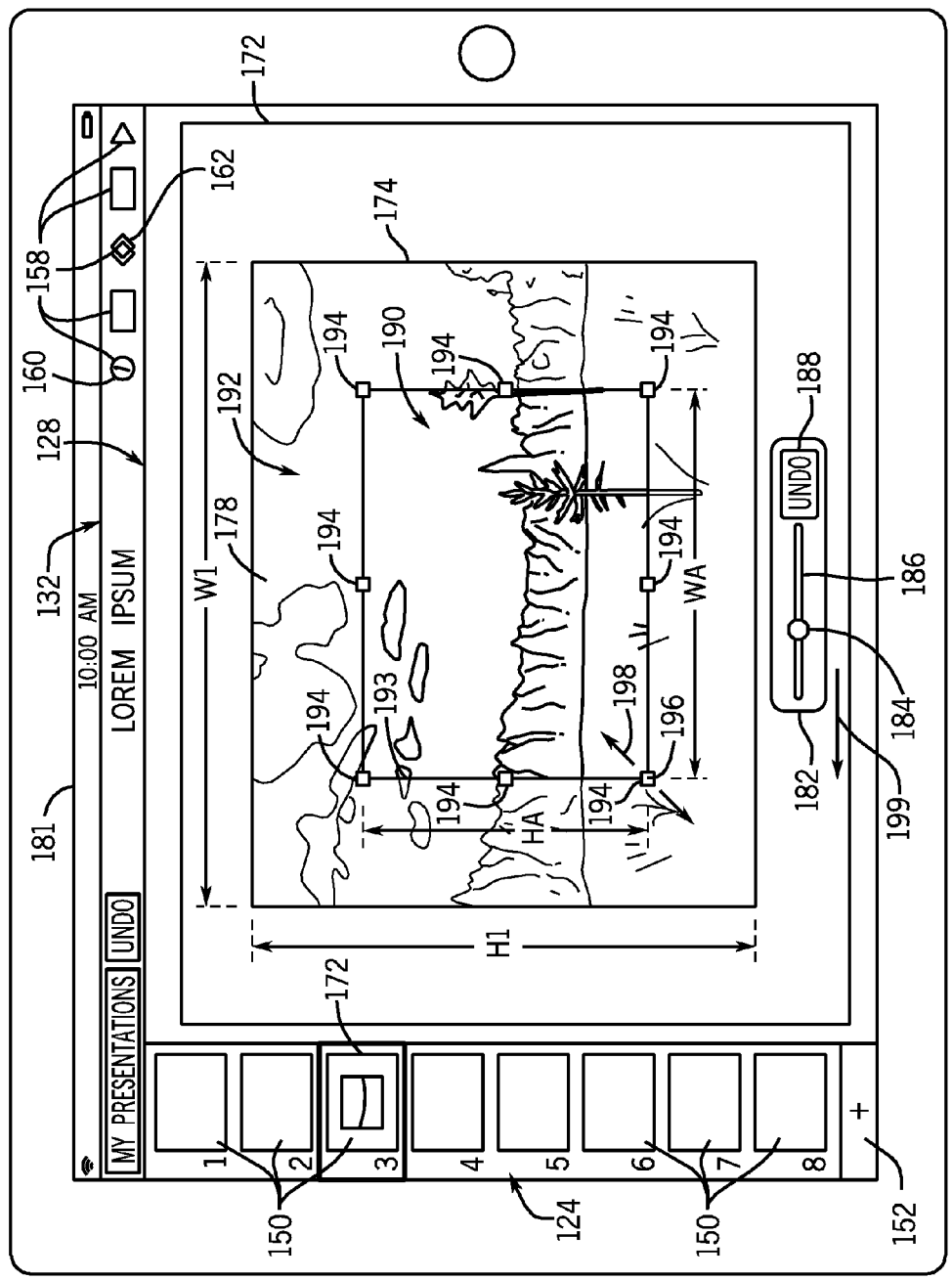

FIG. 7 depicts a screen 181 of the electronic device 10 showing the image mask 178 resized to mask a portion of the image object 174. The image mask 178 includes a mask aperture 190 and a mask frame 192. In some embodiments, the mask frame 192 may be colored, shaded, translucent, opaque, or otherwise distinguished from the mask aperture 190. The mask frame 192 corresponds to those portions of the image object 174 that will be cropped when the image masking process is completed. The aperture 190 corresponds to the portion of the image object 174 that will remain after cropping.

The image object 174 may be resized by moving the slider button 184. As depicted in FIG. 7, the image object 154 may have a height H1 and a width W1 and the aperture 190 may have a height HA and a width WA. Thus, in the intermediate position shown in FIG. 7, the slider 182 corresponds to a ratio of the dimension of the image object to the dimension of the mask aperture that is greater than one, e.g., the greater of the ratio of H1/HA or W1/WA.

As also shown in FIG. 7, the border 193 between the mask aperture 190 and the mask frame 192 may include knobs 194 located at multiple points around the border. In one embodiment, the knobs 194 may be located at the midpoint of each edge of the border and at the intersection of each edge of the border. The knobs 194 may be selected (e.g., touched) and dragged on the screen 170 to resize the image mask 178. For example, as shown in FIG. 7, the knob 196 may be selected (e.g., touched) and dragged along line 198 to resize the image mask 178. If any of the knobs 196 are selected and dragged to resize the image mask 178, the slider 182 may change interactively to reflect the resize of the image mask 178.

As mentioned above, the slider 182 controls the size of the image object 174. Thus, to change the size of the image object 174, a user may select (e.g., touch) the slider button 184 and move the slider button 184 along the axis 186. For example, as shown in FIG. 7, to reduce the size of the image object 174, a user may move the slider button 184 in the direction depicted by arrow 199. As the slider button 184 moves along the axis 186, the image object 174 may be continuously updated to reflect the new position of the slider 182.

Figure 8:
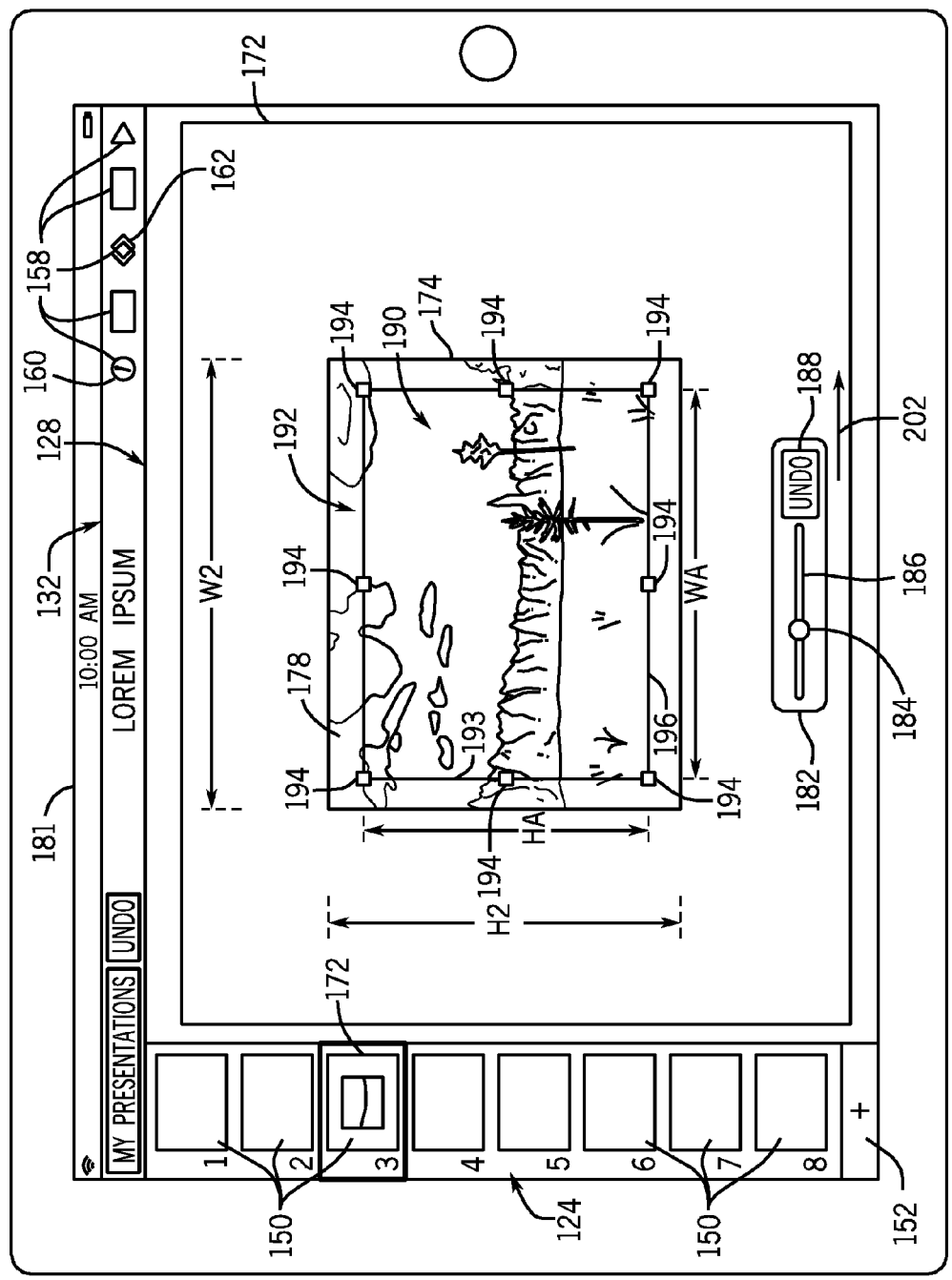
FIG. 8 depicts screens of the image editing mode showing resizing of an image object in accordance with aspects of the present disclosure.

FIG. 8 depicts a screen 200 of the electronic device 10 showing the image object 174 resized in response to movement of the slider 182. As shown in FIG. 8, the image object 174 has a reduced height H2 and reduced width W2 that correspond to the new position of the slider 182. The mask aperture 190 is the same size position and size. Thus, movement of the slider 182 resizes the image object 174 separately from resizing of the mask aperture 190. Accordingly, the mask frame 192 is also reduced in size to indicate those reduced portions of the image object 174 that will be cropped. As mentioned above, as the slider 182 may indicate the ratio of a dimension of the image object 174 to a dimension of the mask aperture 190, the slider 82 may now correspond to the greater of H2/HA or W2/WA. To increase the size of the image object 174, the slider button 184 may be moved along the slider axis 186 in the direction indicated by arrow 202. In this manner, the slider 182 may be used to manipulate the image object 174, and the knobs 194 may be used to manipulate the mask aperture 190.

Figure 9:
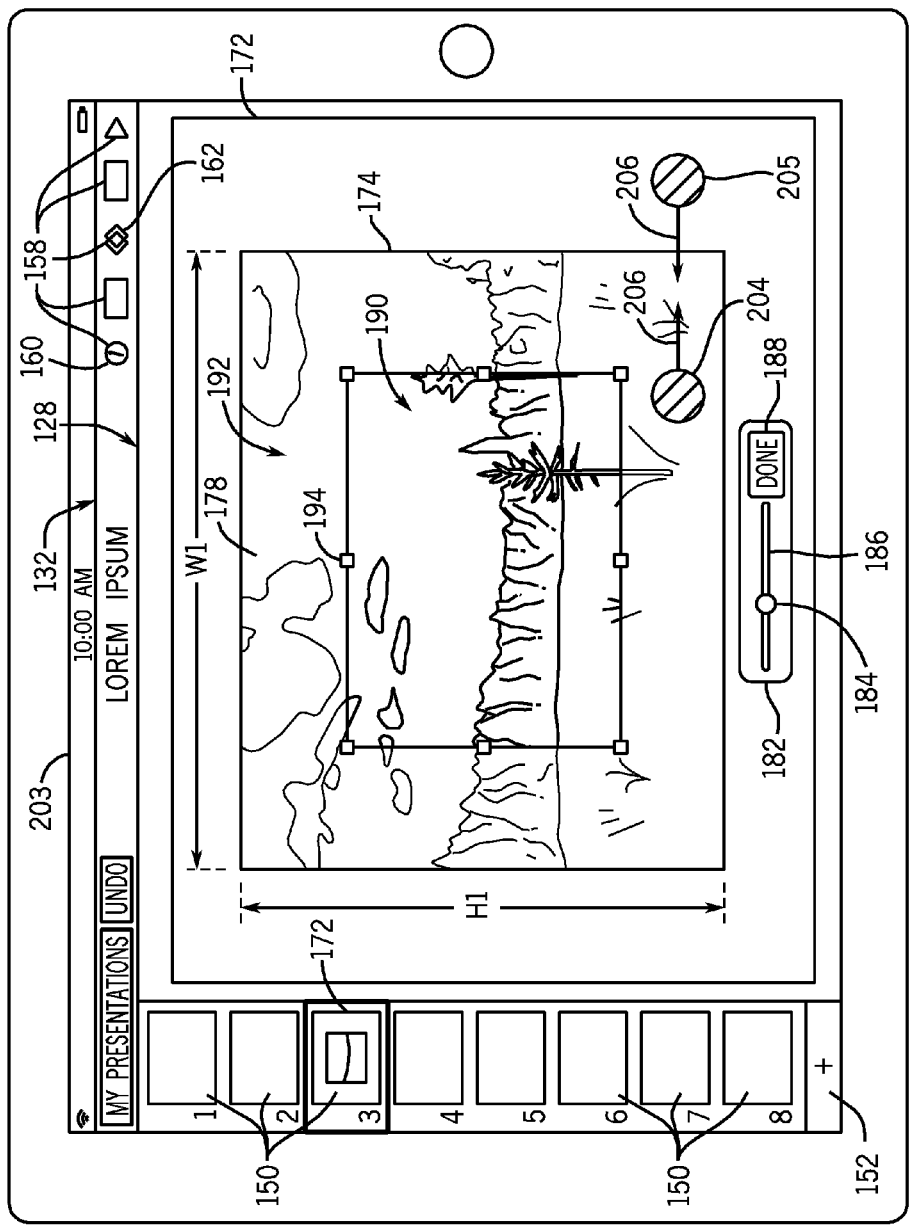
FIGS. 9 and 10 depict screens of the image editing mode showing resizing of the image object and image mask in accordance with aspects of the present disclosure.
Figure 10:
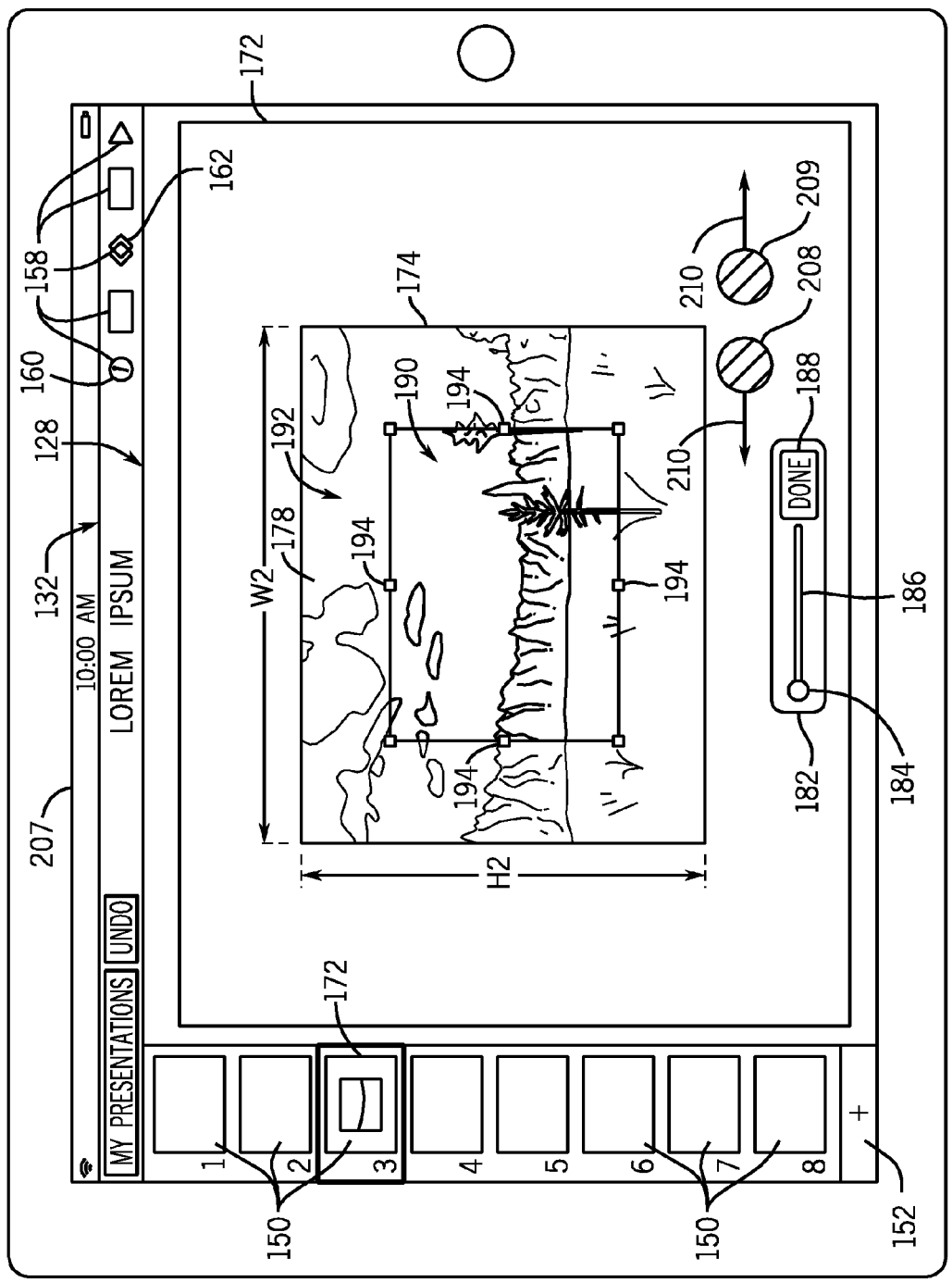

Additionally, the image object 174 (and image mask 178) may be resized such that the proportional size relationship between the image mask 178 and the image object 174 is maintained. FIGS. 9 and 10 depict screens of the electronic device 10 illustrating resizing of the image object 174 from a first height (H1) and width (W1) to a second height (H2) and width (W2). As shown in a screen 203 of the electronic device 10 depicted in FIG. 9, in one embodiment the image object 174 may be resized (e.g., reduced in size) by simultaneously selecting (e.g., touching) a first region 204 of the slide canvas 128 and a second region 205 of the slide canvas 128 and "pinching" the selection regions 204 and 205, such as along line 206. In other embodiments, the image object 174 may be resized by selecting (e.g., touching) a corner of the image object 174 and dragging the corner on the slide canvas 128. During the resize of the image object 174, the image mask 178 may be resized to maintain the current ratio between the image mask 178 and the image object 174. For example, visible or invisible guides (such as snap points), may assist in maintaining the current ratio.

As shown in screen 207 of the electronic device 10 depicted in FIG. 10, after resizing of the image object 174, both the image object 174 and the image mask 178 have resized proportional to each other. Thus, the image object 174 and the image mask 178 (including the mask aperture 190 and the mask frame 192) have reduced in size. As seen in FIG. 10, the position of the slider 182 remains in the same position as in FIG. 9, as the size of the image object 174 relative to the mask aperture 190 is unchanged. In one embodiment, the image object 174 may be resized (e.g., increased in size) by simultaneously selecting (e.g., touching) a first region 208 of the slide canvas 128 and a second region 209 of the slide canvas 128 and "pinching" the selection regions 208 and 209, such as along line 210. In other embodiments, as mentioned above, the image object 174 may be resized by selecting (e.g., touching) a corner of the image object 174 and dragging the corner on the slide canvas 128.

Figure 11:
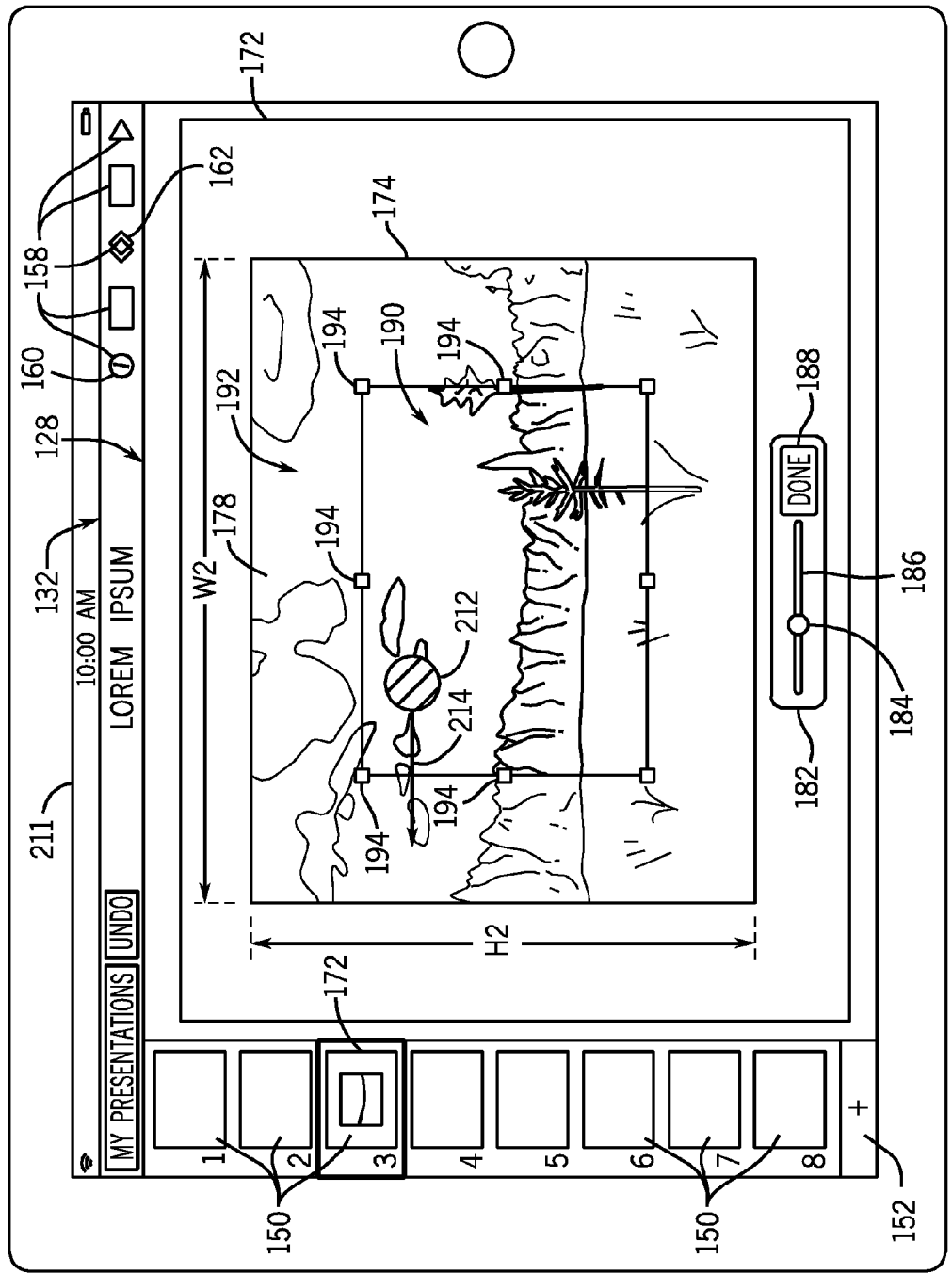
FIGS. 11 and 12 depict screens of the image editing mode showing movement of the image object in accordance with aspects of the present disclosure.

Additionally, the image editing mode may enable movement of the image object 174 on the slide canvas 128, and/or movement of the image mask 178 on the slide canvas 128. Depending on the selection interaction, either the image object 174 or the image mask 178 may be moved on the slide canvas 128. As described further below, FIGS. 11 and 12 depict movement of the image object 174 around the slide canvas 128.

In one embodiment, the image object 174 may be moved on the slide canvas 128 by selecting (e.g., touching) the image object 174 and moving the image object 174 on the slide canvas 128. FIG. 11 depicts a screen 211 of electronic device 10 showing the image object 174 in a first position on the slide canvas 128, and FIG. 12 depicts a screen 213 of the electronic device 10 showing the image object 174 in a second position on the slide canvas 128. As shown in FIG. 11, a first region 212 in the image object 174 may be selected and moved, such as in the direction indicated by line 214, to move the image object 174 in the direction of line 214. Any region 212 of the image object 174, either in the mask aperture 190 or in the mask frame 192, may be selected to enable movement of the image object 174. In such an embodiment, movement of the image object 174 does not move the image aperture 190 such that the image mask 178 maintains its position on the slide canvas 128. The mask frame 192 of the image mask 178 expands to overlay the moved portions of the image object 156 and indicated which portions of the move image object 156 will be cropped. In this manner, the object 156 may be moved separately from the image mask 178.

Figure 12:
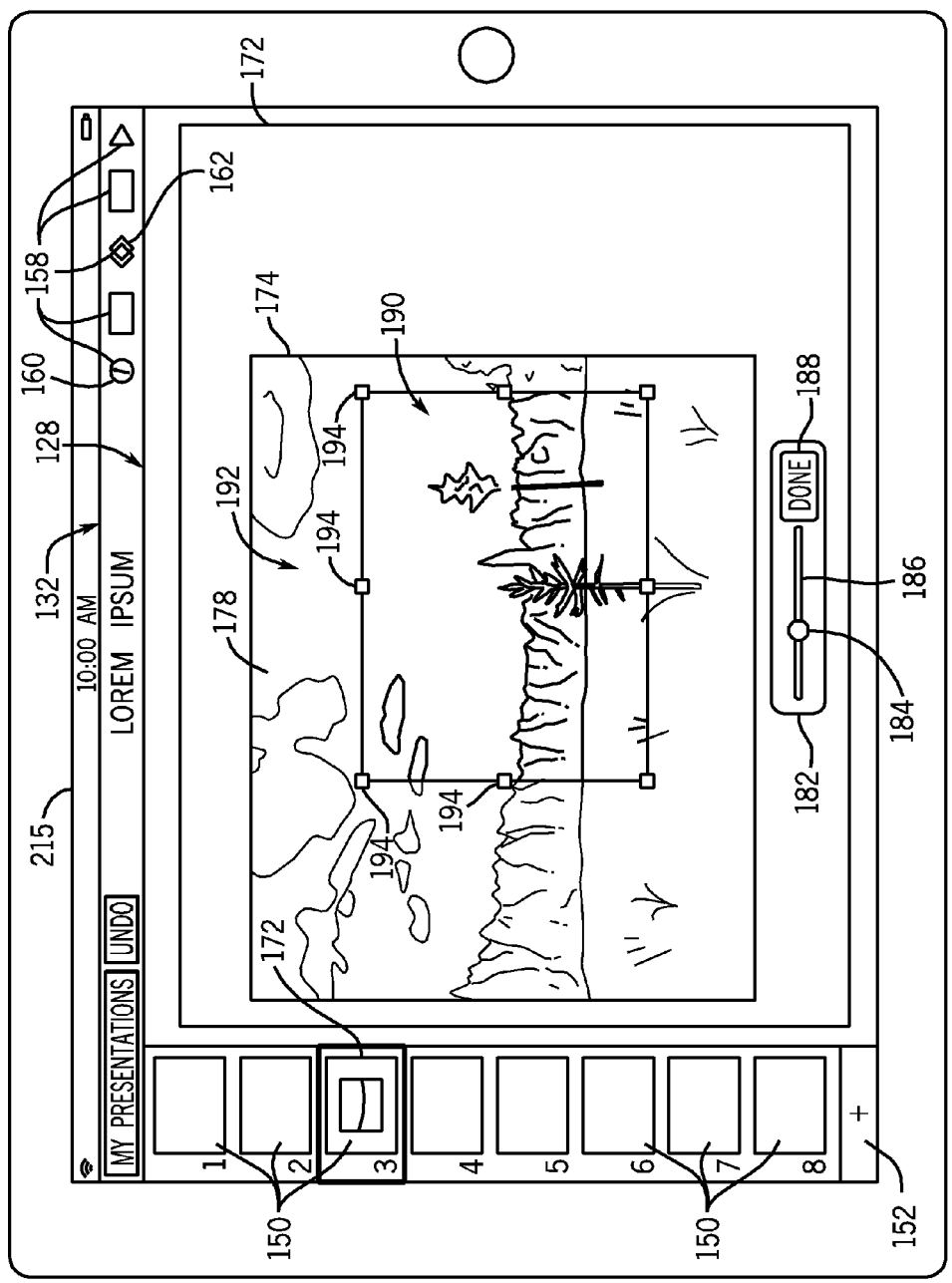

FIG. 12 depicts a screen 215 of the electronic device 10 showing the image object 174 moved to the second position on the slide canvas 128. As noted above, the image aperture 190 of the image mask 178 is in the same position on the slide canvas 128. Thus, the image move function enables movement of the image object 174 on the slide canvas 128 separately from the image mask 178.

Figure 13:
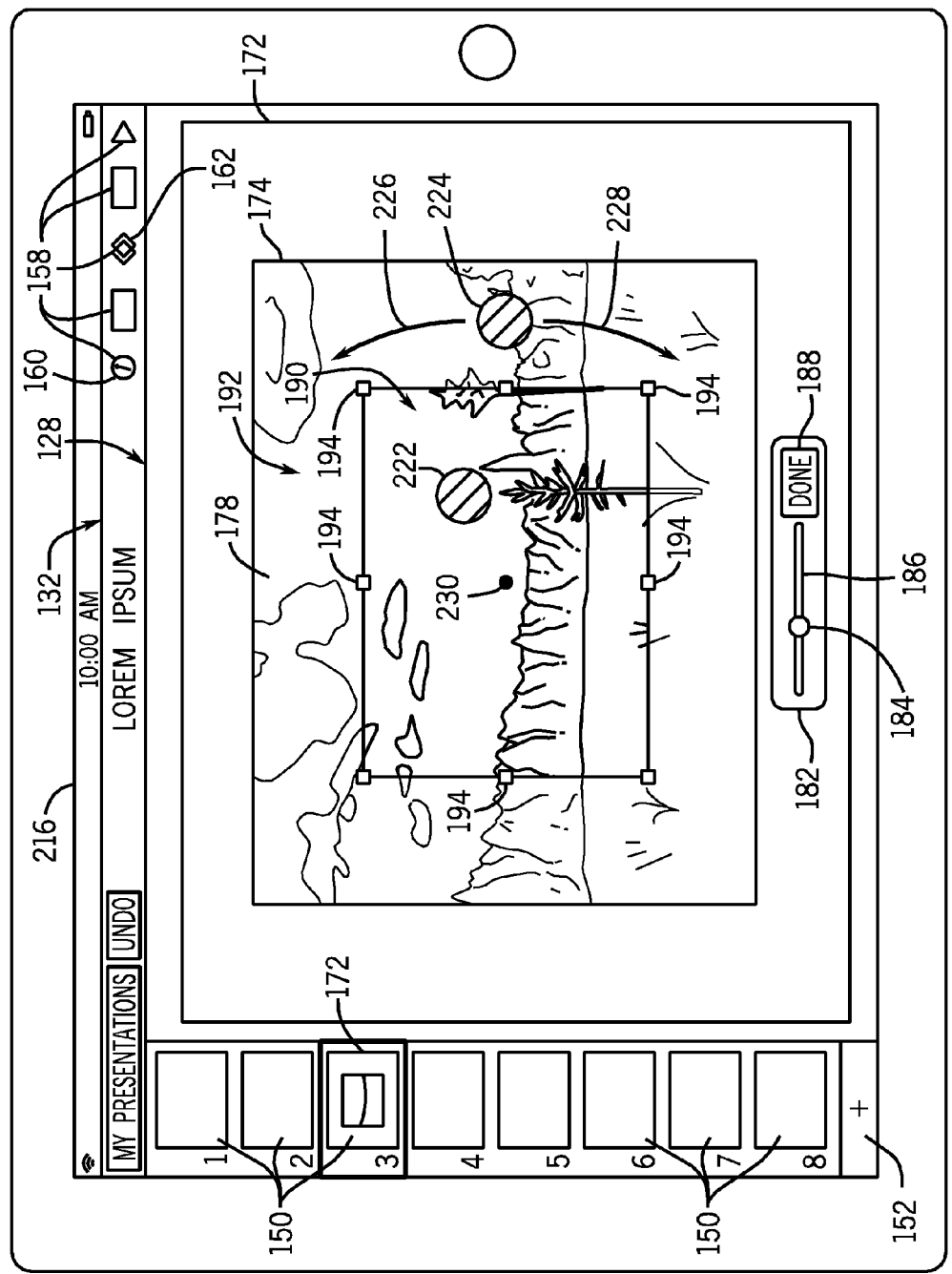
FIGS. 13 and 14 depict screens of the image editing mode showing rotation of the image object and image mask in accordance with aspects of the present disclosure.
Figure 14:
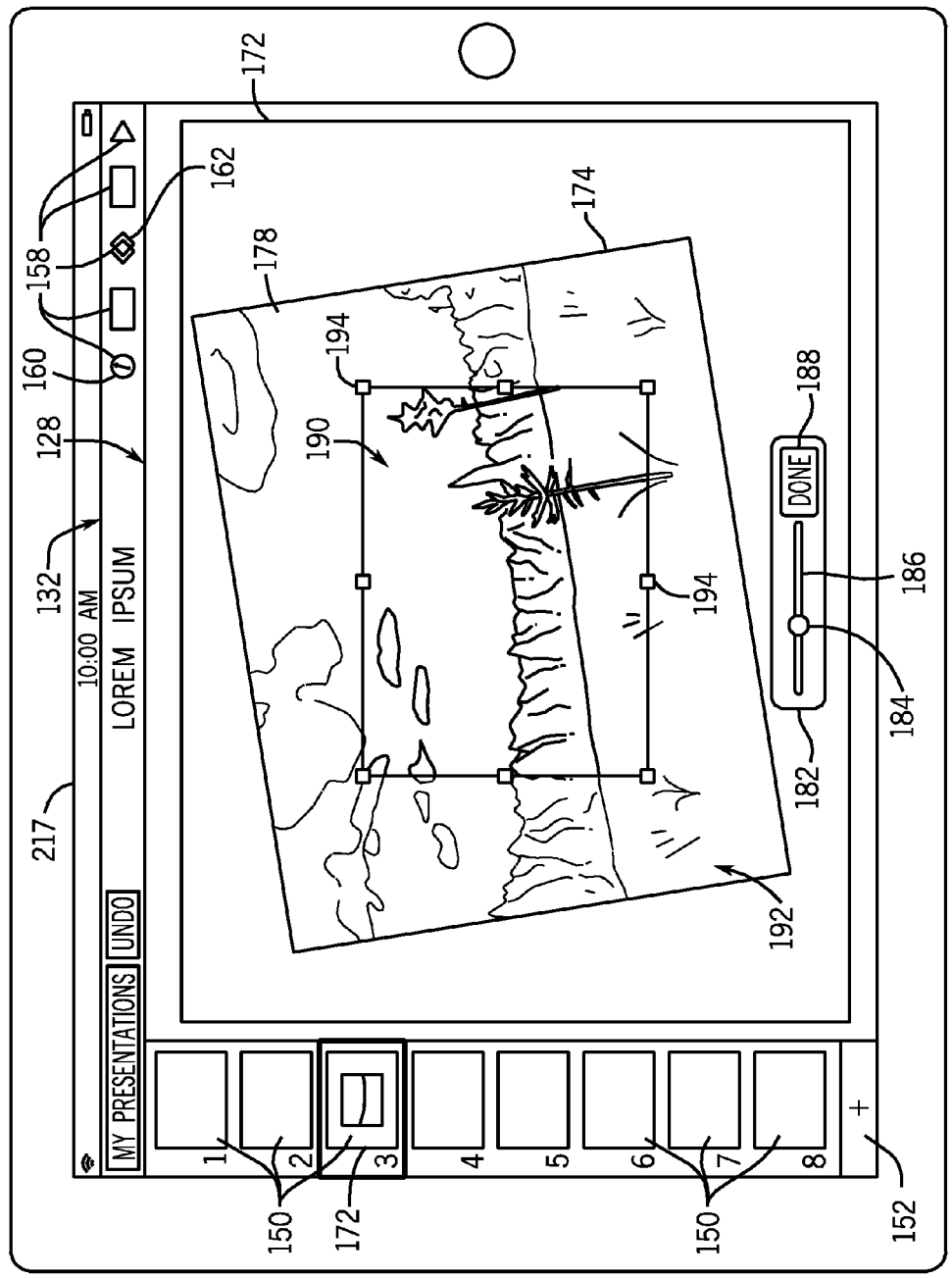

Additionally, the image editing mode may enable rotation of the image object 174 and the image mask 178. In one embodiment, the image object 174 may be rotated on the slide canvas 128 by selecting a first region in the image object 174 (or the image mask 178) and rotating a second selected region around the first region. FIGS. 13 and 14 depict rotation of the image object 174 on the slide canvas 128 between a first position and a second position.

FIG. 13 depicts a screen 220 showing the image object 156 in a first position on the slide canvas 128. To rotate the image object 174, a first region 222 on the image object 174 may be selected (e.g., touched) onto the slide canvas 128 and onto the image object 174, and a second region 224 on the image object 174 may be simultaneously selected (e.g., touched). The first region 222 and second region 224 may be any region in the image object 174, including the image mask 178. Once both regions are selected, to rotate the image object 174 counterclockwise, the second region 224 may be moved around the first region 222 in a counterclockwise direction, as indicated by arrow 226. Similarly, once both regions are selected, to rotate the image object 174 clockwise, the second region 224 may be moved in a clockwise direction around the first region 222 in a counter clockwise direction, as indicated by line 228. After selection of both regions 222 and 224, the first region 222 may be released the image object 174 may be rotated by moving the second region 224. The image object 174 rotates around a z-axis extending through the center 230 of the image object 174.

FIG. 14 depicts a screen 232 showing the image object 174 in a second position after rotation in the counterclockwise direction indicated by line 228. As shown in FIG. 14, the image object 174 rotates around the center 230 of the image object 174. The mask aperture 190 maintains its position on the slide canvas 128 during and after the rotation. The mask frame 192 rotates accordingly to overlay those portions of the image object 174 outside of the image aperture 190. The image object 174 may be rotated in any direction and in any region of the slide canvas 128 in the manner described above.

Figure 15:
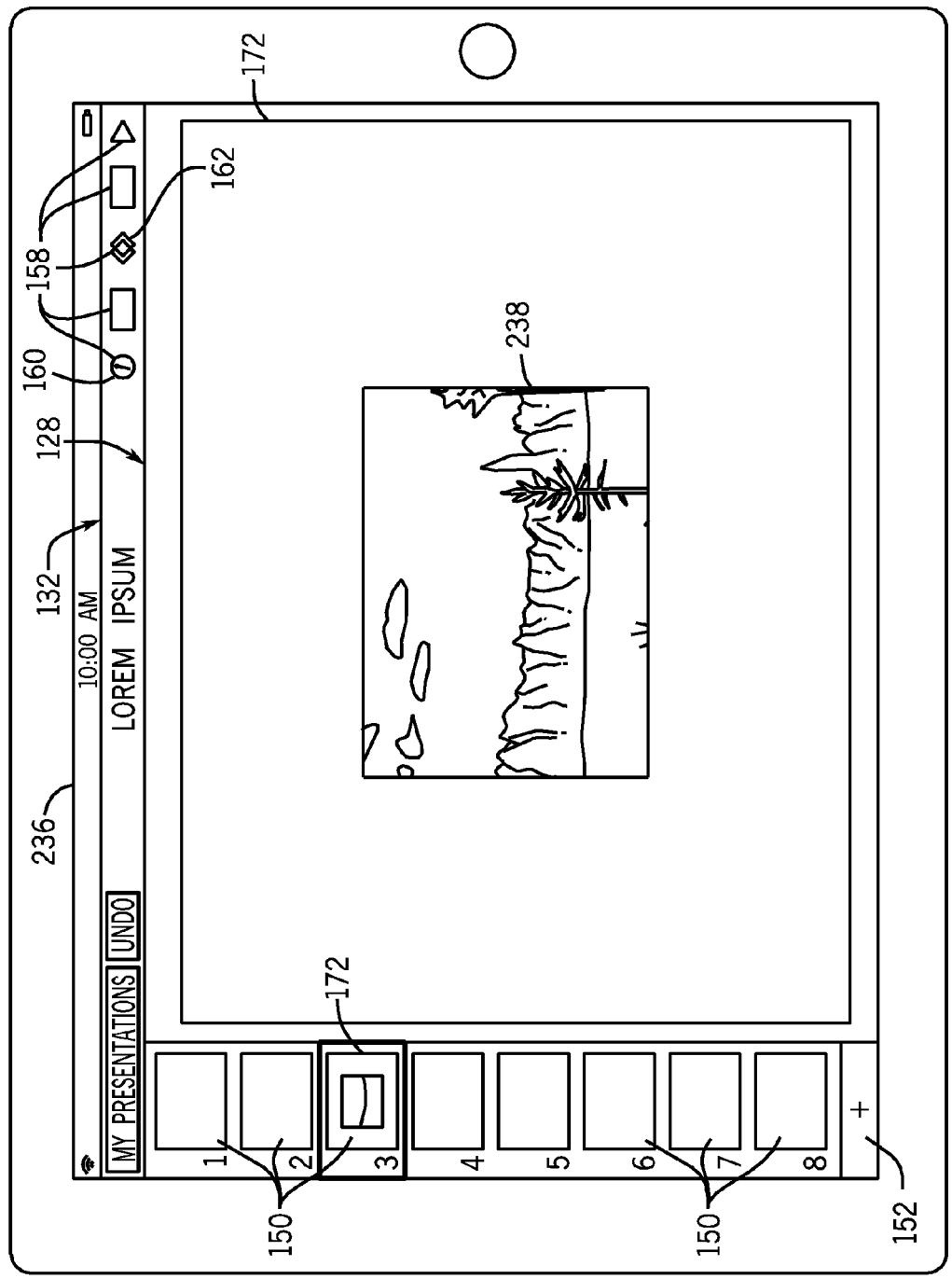
FIG. 15 depicts a screen of the image object after completion of the image editing mode in accordance with aspects of the present disclosure.

After a user has edited the image object 174, such as be moving, sizing and rotating the image object 174 and the image mask 178 as described above, the user may complete the editing process. The image edit mode may include multiple interactions to exit the image edit mode. For example, the user may select (e.g., touch) the "DONE" icon 188, depicted above in FIGS. 6-14. In another example, the user may "double tap" (e.g., touch twice in quick succession) any region on the slide canvas 128 outside of the image object 174. FIG. 15 depicts a screen 236 showing the edited image object 238 after a user has completed the image edit process. The image object 174 has been cropped by the image mask 178 depicted above in FIG. 7. As shown in FIG. 15, those portions of the image object 174 underlying the mask frame 192 have been removed from the image object 174 and are no longer displayed on the slide canvas 128. Accordingly, those portions of the original image object 174 visible through aperture 190 are the edited image object 238.

Figure 16:
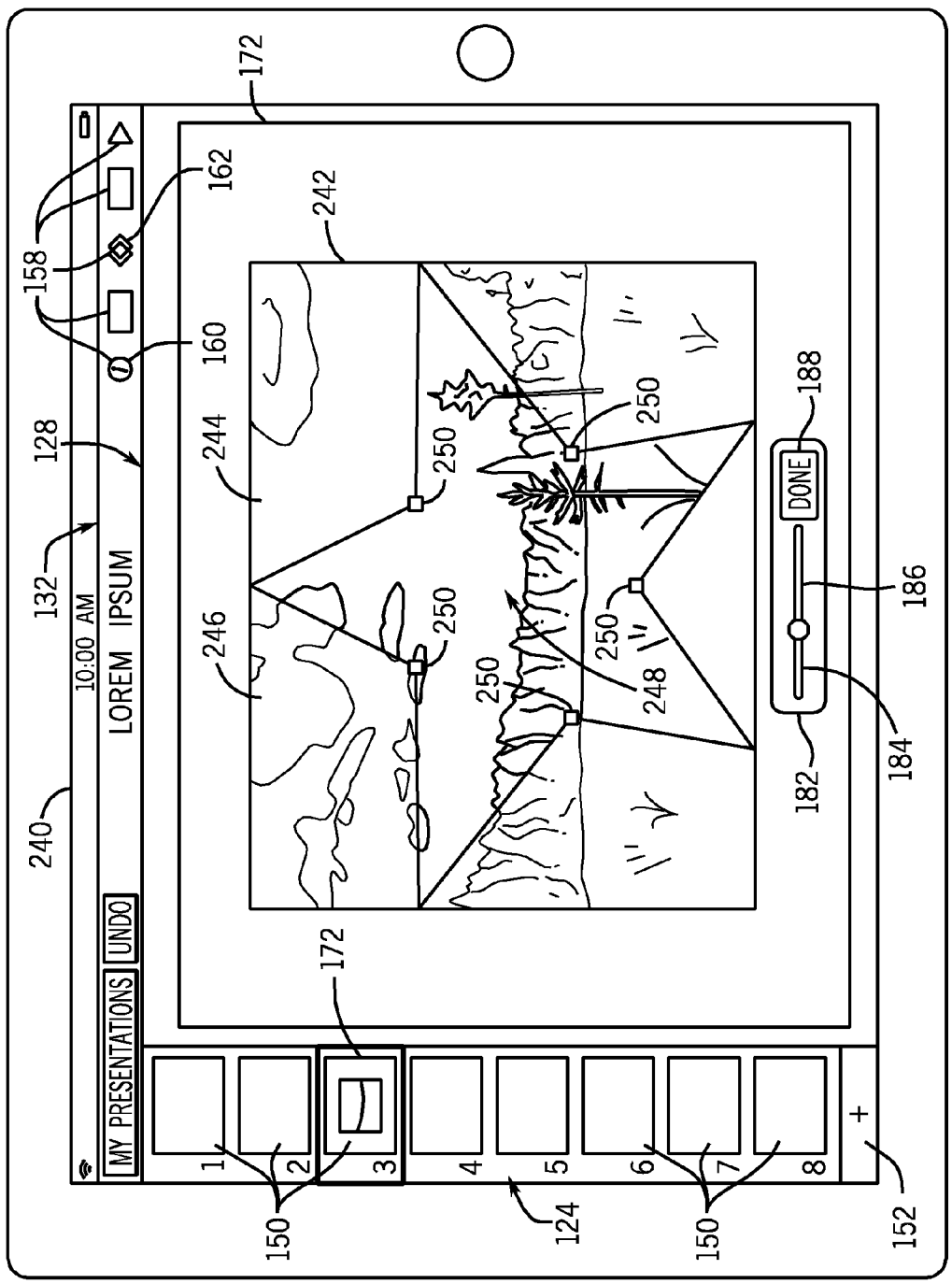
FIG. 16 depicts a screen of the image editing mode with an irregular image mask in accordance with aspects of the present disclosure.

In some embodiments, the image editing feature of the multi-function electronic device 70 may be capable of importing and/or creating an image mask of any size and shape. FIG. 16 depicts a screen 240 of the electronic device 10 during an image editing process showing an image object 242 having an image mask 244. The image mask 244 shown in FIG. 16 is an irregular shaped polygon having an irregular shaped frame 246 and aperture 248. The image mask 246 includes knobs 250 arranged at the border 252 of the frame 246 and the aperture 248. The slider 182 corresponding to the size of the image mask 246 relative to the image object 242 may be displayed on the slide canvas 128. As described above, the slider 182 may change the relative size of the image mask 244 by moving the slide button 184 along the slide axis 186, and the "DONE" icon 188 may be selected (e.g., touched) to indicate completion of the editing process. In some embodiments, the slider 182 may be used to change the shape of the image mask 178. Alternatively, to resize the image mask 244, any of the knobs 250 may be selected and moved over the slide canvas. As also described above, the image mask 244 may be moved by selecting and holding the mask frame 246 and moving the image mask on the slide canvas 128.

Figure 17:
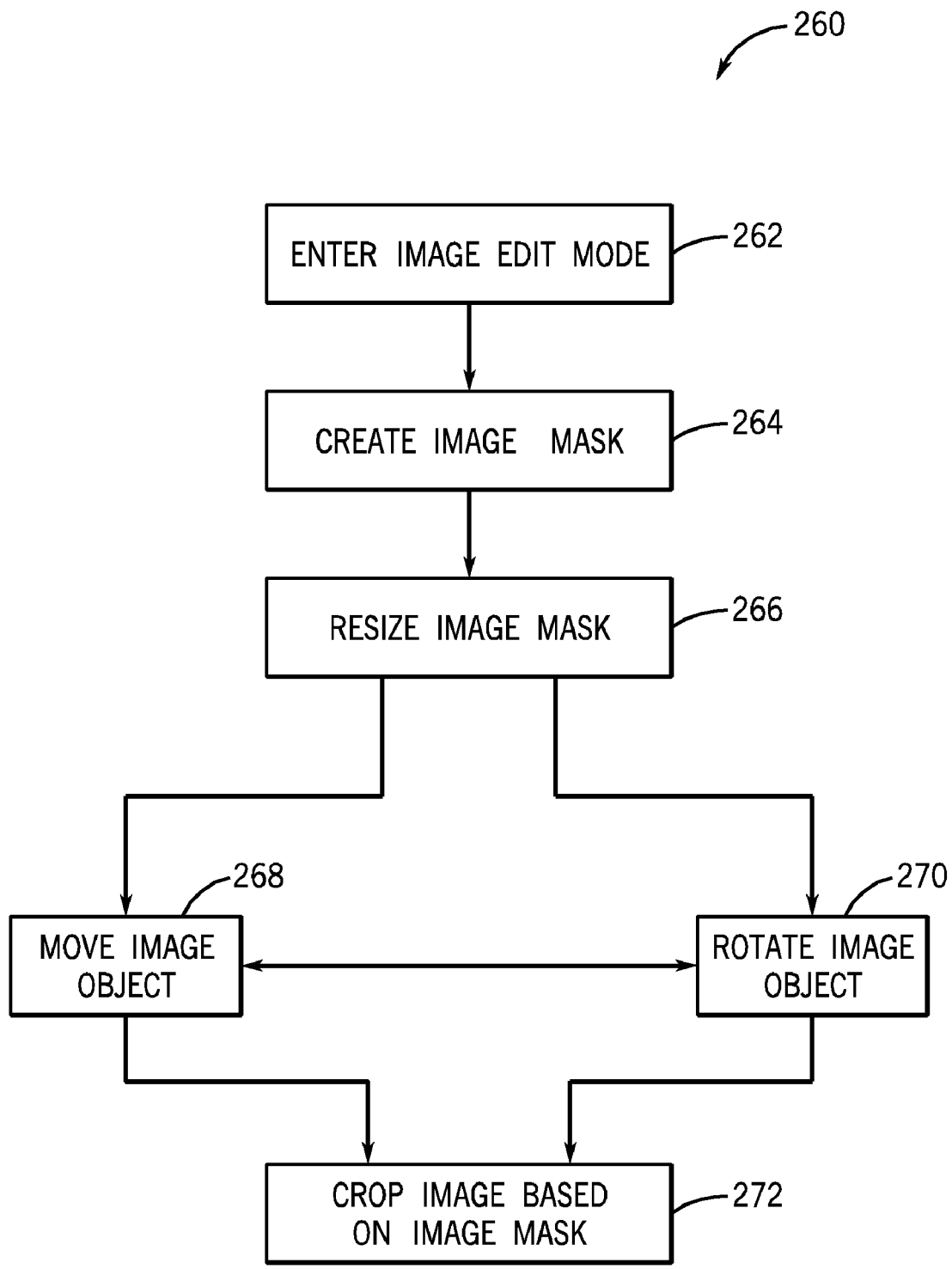
FIG. 17 is a flowchart depicting a process for image editing in accordance with aspects of the present disclosure.

FIG. 17 depicts a process 260 summarizing the image editing functions described above. As noted above, the process 260 may be implemented as routines executable by a processor and stored as a computer program product on tangible computer-readable media, such as storage memory components 14. Initially, the device 10 may enter an image editing mode (block 262) for an image object, based on a selection from a user. Upon initiation of the image editing mode, an image mask may be created and overlaid on the image object (block 264). As described above, the image mask may initially include a mask aperture having the same dimensions as the image object. The electronic device 10 may resize the image mask based on actions received from a user (block 266), such as movement of the knobs of the mask frame and/or movement of the slider.

As described above, various editing functions may occur on the electronic device 10. The image object may be moved (block 268) in response to actions received from a user, such as by the user selecting and holding image object through the mask aperture and moving the image object on the slide canvas. Further, the image object may be rotated (block 270) based on a actions received from a user, such as by the user selecting and holding a first region on the image object and rotating a second selected region around the first region. After receiving completion of the image editing process, such as by a user selecting the "DONE" icon on the slide canvas, the image object may be cropped based on the image mask (block 272).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An interface for an electronic device, comprising:
    a touch-sensitive display;
    an image object displayed on the display;
    an image mask displayed on the display; and
    a slider displayed on the display, wherein the slider comprises a touch-sensitive slider button moveable on a slider axis between a plurality of positions, the slider controls the size of the image object separately from the image mask, the position of the slider button on the slider axis is based on the greater of a first ratio or a second ratio, the first ratio comprises height of the image object to height of a mask aperture of the image mask, and the second ratio comprises width of the image object to width of the mask aperture of the image mask.

2. The interface of claim 1, wherein the image mask comprises a plurality of touch-sensitive knobs displayed on a border between the mask aperture of the image mask and a mask frame of the image mask.

3. The interface of claim 2, wherein each of the plurality of knobs are moveable between a respective one of the plurality of positions to control the size of the image mask relative to the image object.

4. The interface of claim 1, wherein the slider comprises a touch-sensitive icon configured to crop the image object based on a mask frame of the image mask and the mask aperture of the image mask.

5. The interface of claim 1, wherein the position of the slider button on the slider axis determines a ratio of a first dimension of the image object to a second dimension of the image mask.

6. The interface of claim 1, comprising a touch-sensitive region outside of the image object, wherein the touch-sensitive region is configured to receive a gesture to remove the image mask from the display.

7. The interface of claim 1, wherein the image mask comprises the mask aperture overlying a first region of the image object, and a mask frame overlying a second region of the image object, wherein the second region corresponds to a croppable portion of the image object.

8. The interface of claim 1, wherein the mask frame comprises a shaded frame, a colored frame, a translucent frame, or an opaque frame.

\* \* \* \* \*